United States Patent
George et al.

(10) Patent No.: US 9,607,262 B2
(45) Date of Patent: Mar. 28, 2017

(54) SYSTEM AND METHOD FOR A RECURSIVE CORTICAL NETWORK

(71) Applicant: Vicarious FPC, Inc., Union City, CA (US)

(72) Inventors: Dileep George, Union City, CA (US); Kenneth Kansky, Union City, CA (US); D Scott Phoenix, Union City, CA (US); Bhaskara Marthi, Union City, CA (US); Christopher Laan, Union City, CA (US); Wolfgang Lehrach, Union City, CA (US)

(73) Assignee: Vicarious FPC, Inc., Union City, CA (US)

( * ) Notice: Subject to any disclaimer, the term of this patent is extended or adjusted under 35 U.S.C. 154(b) by 0 days.

(21) Appl. No.: 15/158,450

(22) Filed: May 18, 2016

(65) Prior Publication Data
US 2016/0267375 A1    Sep. 15, 2016

Related U.S. Application Data

(63) Continuation of application No. 13/895,225, filed on May 15, 2013, now Pat. No. 9,373,085.
(Continued)

(51) Int. Cl.
*G06N 3/04* (2006.01)
*G06N 5/04* (2006.01)
(Continued)

(52) U.S. Cl.
CPC .............. *G06N 3/04* (2013.01); *G06N 3/049* (2013.01); *G06N 3/0454* (2013.01); *G06N 3/082* (2013.01);
(Continued)

(58) Field of Classification Search
None
See application file for complete search history.

(56) References Cited

U.S. PATENT DOCUMENTS

| | | | |
|---|---|---|---|
| 7,711,663 | B2 | 5/2010 | Weng |
| 7,739,208 | B2 | 6/2010 | George et al. |

(Continued)

OTHER PUBLICATIONS

Bergthold et al, A Study of Parts-Based Object Class Detection Using Complete Graphs, 2009.
(Continued)

*Primary Examiner* — Stanley K Hill
*Assistant Examiner* — Mikayla Chubb
(74) *Attorney, Agent, or Firm* — Jeffrey Schox; Thomas Gwinn

(57) ABSTRACT

A method for generating patterns with a network includes providing a recursive network of sub-networks with a parent feature node and at least two child feature nodes; and at a first sub-network of the recursive network, the first sub-network including the parent feature node and the at least two child feature nodes, selecting a first pool node and a second pool node consistent with a selection function of the parent feature node, selecting at least a first parent-specific child feature (PSCF) node that corresponds to a first child feature node of the sub-network, selecting at least a second parent-specific child feature (PSCF) node that corresponds to a second child feature node of the sub-network; and compiling the state of final child feature nodes, including the first and second child feature nodes, of the network into a generated output.

20 Claims, 15 Drawing Sheets

Related U.S. Application Data

(60) Provisional application No. 61/647,085, filed on May 15, 2012.

(51) Int. Cl.
   *G06N 99/00* (2010.01)
   *G06N 3/08* (2006.01)
   *G06N 7/00* (2006.01)

(52) U.S. Cl.
   CPC .............. *G06N 5/04* (2013.01); *G06N 7/005* (2013.01); *G06N 99/005* (2013.01)

(56) References Cited

U.S. PATENT DOCUMENTS

| | | |
|---|---|---|
| 8,103,603 B2 | 1/2012 | George et al. |
| 8,200,025 B2 | 6/2012 | Woodbeck |
| 8,290,886 B2 | 10/2012 | George et al. |
| 8,332,339 B2 | 12/2012 | Nugent |
| 8,340,435 B2 | 12/2012 | Duong et al. |
| 8,369,652 B1 | 2/2013 | Khosla et al. |
| 8,442,321 B1 | 5/2013 | Chang et al. |
| 8,798,375 B1 | 8/2014 | Chang et al. |
| 2008/0154815 A1 | 6/2008 | Martinez |
| 2009/0299929 A1 | 12/2009 | Kozma et al. |
| 2013/0243259 A1 | 9/2013 | Kawaguchi et al. |
| 2013/0259307 A1 | 10/2013 | Torii et al. |

OTHER PUBLICATIONS

Fidler et al, Similarity-based cross-layered hierarchical representation for object categorization, 2008.

Pedersoli et al, A Coarse-to-fine approach for fast deformable object detection, 2011.

Sun et al, Articulated Part-based Model for Joint Object Detection and Pose Estimation, 2011.

Yang et al, Articulated Pose Estimation with Flexible Mixtures-of-parts, 2011.

SYSTEM AND METHOD FOR A RECURSIVE CORTICAL NETWORK

CROSS-REFERENCE TO RELATED APPLICATIONS

This application is a continuation of U.S. patent application Ser. No. 13/895,225, filed on 15 May 2013, which claims the benefit of U.S. Provisional Application Ser. No. 61/647,085, filed on 15 May 2012, both of which are incorporated in their entireties by this reference.

TECHNICAL FIELD

This invention relates generally to the artificial intelligence field, and more specifically to a new and useful system and method for a recursive cortical network in the artificial intelligence field.

BACKGROUND

Despite advances in computer vision, image processing, and machine learning, recognizing visual objects remains a task where computers fail in comparison with the capabilities of human. Recognizing an object from an image not only requires recognizing the image in a scene but also recognizing objects in various positions, in different settings, and with slight variations. For example, to recognize a chair, the innate properties that make a chair a chair must be understood. This is a simple task for a human. Computers struggle to deal with the vast variety of types of chairs and the situations in which a chair may be present. The problem is even more challenging when considering the problem of detecting multiple objects in a scene. Models exist for object recognition such as convolution neural networks, HMAX models, Slow Feature Analysis (SFA), and Hierarchical Temporal Memory (HTM), but these approaches fail to achieve results near ideal recognition performance. Object detection is more broadly a problem of pattern detection. Pattern detection is a problem in other fields and mediums outside of image processing such as speech recognition, natural language processing, and other fields. Additionally, the inverse of pattern recognition is generation. Generating patterns have similar problems, and existing approaches similarly fail to produce satisfactory results. Thus, there is a need in the artificial intelligence field to create a new and useful system and method with improved object recognition (or "inference") and generation. This invention, which is designated a recursive cortical network, provides such system and method.

DESCRIPTION OF THE PREFERRED EMBODIMENTS

The following description of preferred embodiments of the invention is not intended to limit the invention to these preferred embodiments, but rather to enable any person skilled in the art to make and use this invention.

1. System for a Recursive Cortical Network

Figure 1A:
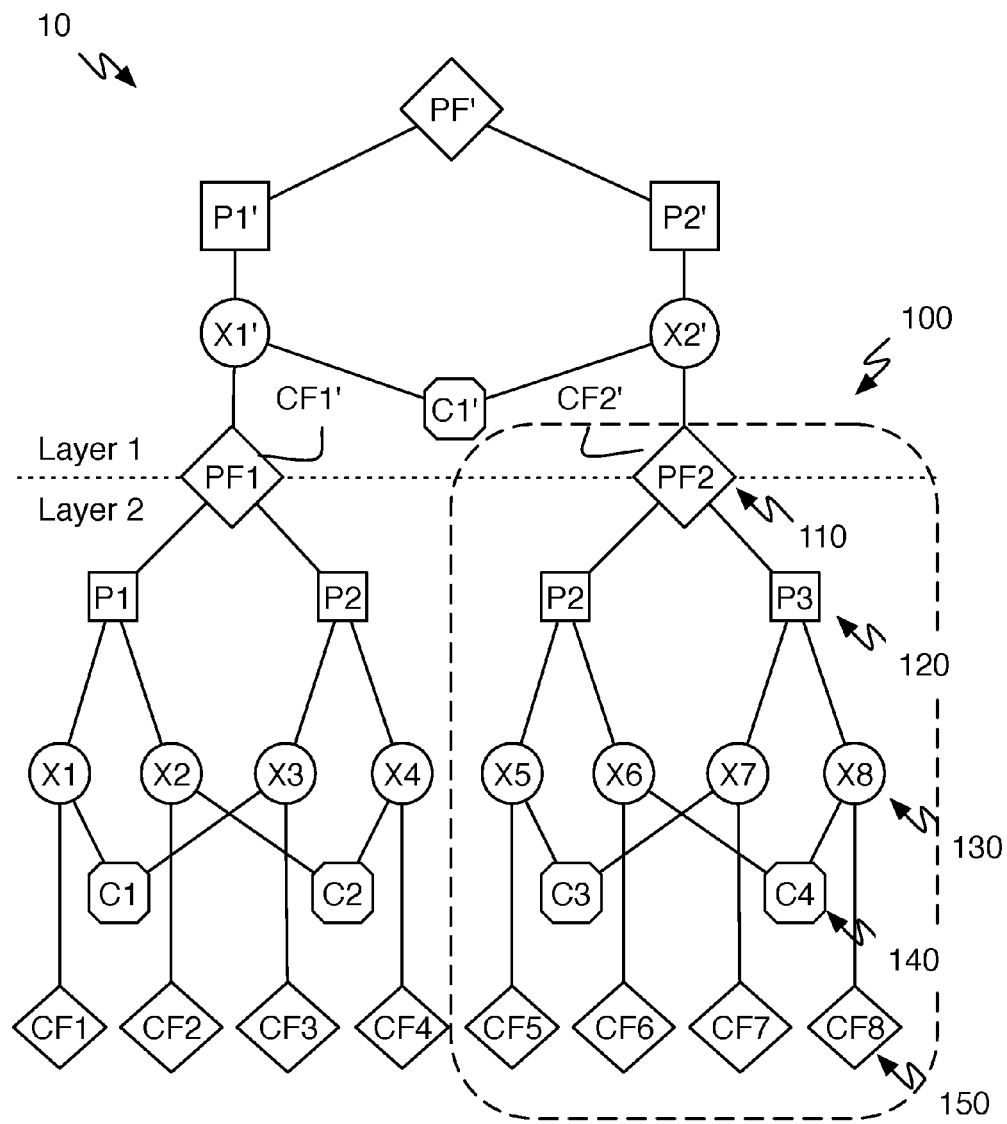
FIGS. 1A and 1B are schematic representations of systems of a preferred embodiment.
Figure 1B:
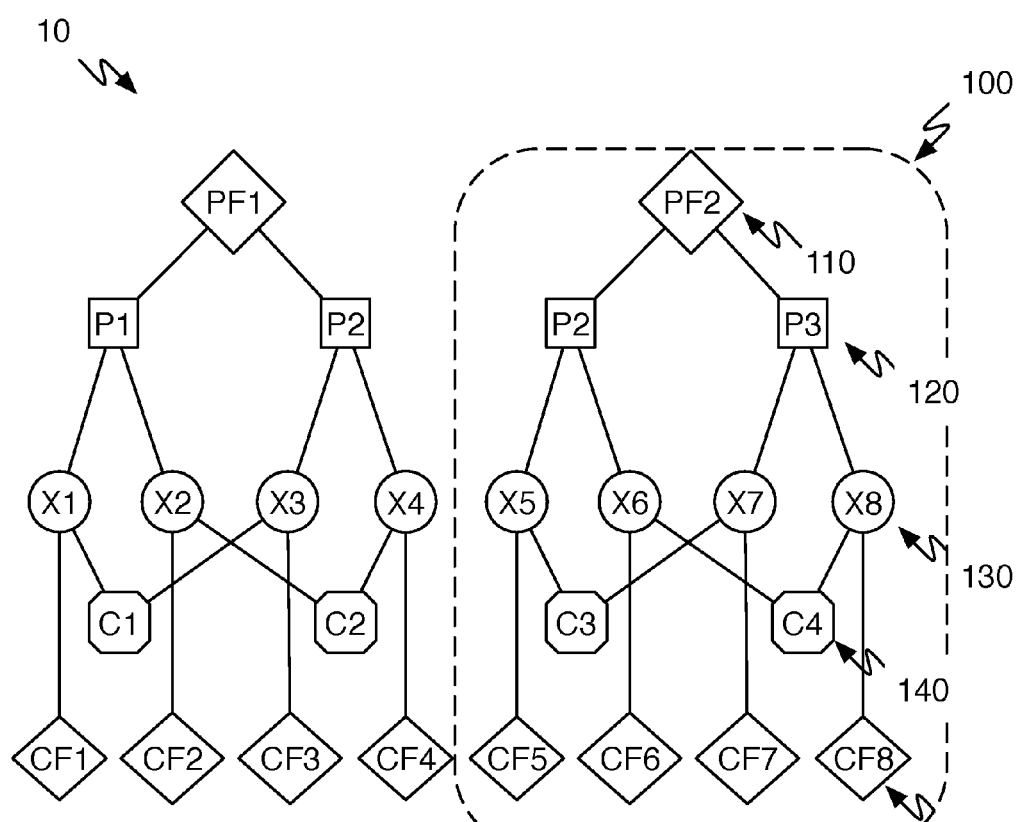

As shown in FIGS. 1A and 1B, a system of the preferred embodiment includes a recursive cortical network 10 of a plurality of sub-networks 100. A sub-network preferably includes at least a parent feature node 110, a pool node 120, a parent-specific child feature node 130 (or PSCF node for short), and at least a constraint node 140. The system functions to improve invariance, selectivity, and sharing of information within the network. The network in one sense is a network of distributed processing elements that implement summation, multiplication, exponentiation or other functions on its incoming messages/signals. Patterns can be inferred and/or generated by propagating node activation through the network. The network, which can be modeled as a neural network or a Bayesian network, can be enabled and implemented through a variety of implementations. In a first implementation, the system is implemented as a network of electronically coupled functional node components. The functional node components can be logical gates arranged or configured in a processor to perform a specified function. In a second implementation, the system is implemented as a network model programmed or configured to be operative on a processor. The network model is preferably electronically stored software that encodes the operation and communication between nodes of the network. The network 10 can be used in a wide variety of applications and can use a wide variety of data types as input such as images, video, audio, natural language text, analytics data, widely distributed sensor data, or other suitable forms of data. Additionally, the network 10 can be configured for different operational modes, including a first mode of operation: generation mode, and a second mode: inference mode. The network 10 is preferably a hierarchically organized network of interconnected sub-networks in various parent-child relationships as shown in FIG. 1A. The network may alternatively be a single layer of a collection of sub-networks as shown in FIG.

1B or a single sub-network. The resulting forms of the network 10 described herein can be referred to as a recursive cortical network (RCN) in part due to the repeated sub-network patterns used in implementing a unique form of a neural network—a cortical network.

Figure 2:
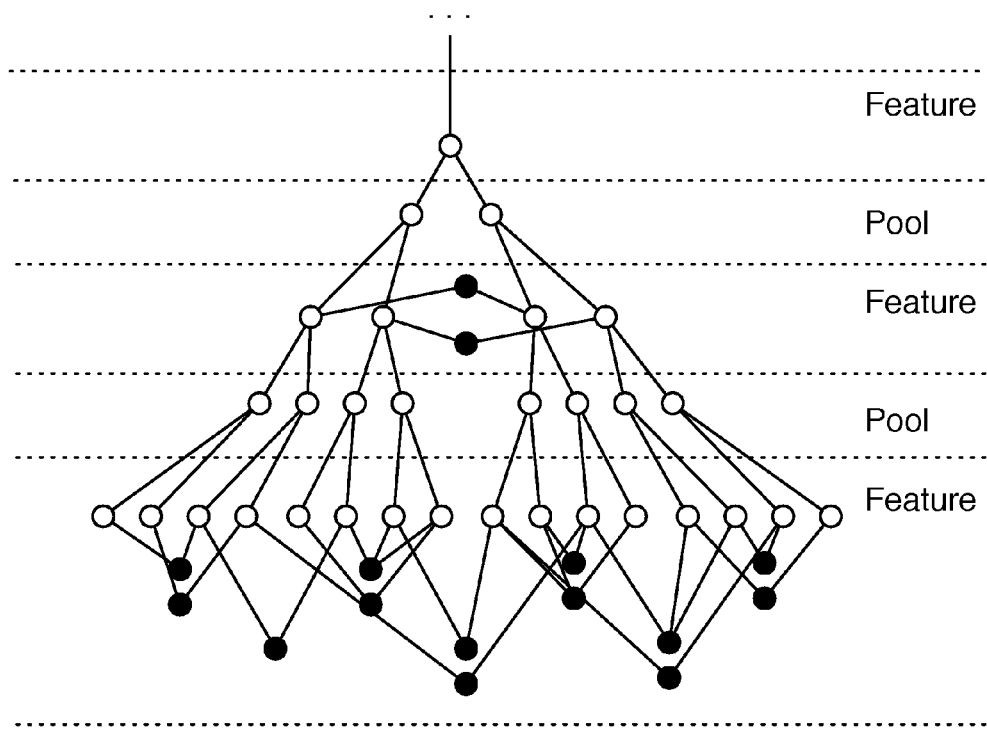
FIG. 2 is a schematic representation of a generalized representation of a system of a preferred embodiment.

The hierarchical network 10 of the preferred embodiment functions to structure sub-networks within various layers. As shown in FIG. 2, various instances and instantiations of sub-networks 100 are preferably constructed, connected, and used recursively in the hierarchy of the network 10. The architecture of the hierarchical network 10 may be constructed algorithmically or through at least partial user selection and configuration. The hierarchical network 10 can be described as alternating layers of feature nodes and pool nodes in a neural network. The sub-networks have feature input nodes and feature output nodes, and the feature nodes are used to bridge or connect the sub-networks. As shown in FIG. 2, the feature nodes can be constrained to various invariant patterns through the use of constraint nodes that bridge constraints across pools and spatially or temporally different sub-networks. Each node of the hierarchical network will preferably have parent node connections and child node connections. Generally, the parent node connections are preferably inputs during generation and outputs during inference. Conversely, the child node connections are outputs during generation and inputs during inference. In the variation of a single layer (or non-hierarchical) sub-networks 100 are arranged as siblings. The sub-networks 100 as described below may have interactions through various forms of constraint nodes.

The sub-networks 100 may be set up in a variety of different configurations within a network. Many of the configurations are determined by constraint nodes that define the node-selection within a sub-network, between sub-networks, or even between networks. Additionally, sub-networks can be set up to have distinct or shared child features. The sub-networks are additionally arranged in hierarchical layers. In other words, a first sub-network may be the parent of a second sub-network. Similarly, the second sub-network may additionally be the parent of a third sub-network. The layers of sub-networks are preferably connected through shared parent feature nodes and child feature nodes. Preferably, a child feature node of a top layer sub-network is the parent feature node of lower a sub-network. Conversely, the parent feature nodes of a sub-network 100 can participate as the child feature nodes of a higher sub-network 100. The parent feature nodes of the top-level sub-networks are preferably the inputs into the system. The child features of the bottom/lowest sub-networks are preferably the outputs of the system. Connecting multiple sub-networks 100 can introduce multi-parent interactions at several nodes in the network. These interactions can be modeled using different probabilistic models in the nodes.

Connecting the sub-networks 100 in a hierarchy can function to promote compact and compressed representations through sub-network re-use. Parent feature nodes of one sub-network can participate as child feature nodes in multiple parent sub-networks. A similar benefit is that invariant representations of a child sub-network can be re-used in multiple parent sub-networks 100. One example of where this would be applicable is in the case of the network 10 representing visual objects. The lower-level sub-networks 100 can correspond to parts of objects and the higher level sub-networks (i.e., upper layer sub-networks) can represent how those parts come together to form the object. For example, the lower level sub-networks can correspond to representations for the body parts of an image of a cow. Each body part will be invariantly represented and will be tolerant to location transformations like translations, scale variations, and distortions. The higher level sub-network then will specify how the body parts come together to represent a cow. Some of the lower-level body parts of a cow could be re-used at a higher level for representing a goat. For example, the legs of both of these animals move similarly and hence those parts could potentially be re-used. This means that the invariant representations learned for the legs of cows can be automatically re-used for representing goats.

The system may be used for inference or generation. Inference can include pattern detection, classification, prediction, system control, decision making, and other applications involving inferring information from data. Generation can include producing static graphics, video graphics, audio media, textual content, selecting actions or responses, or any suitable medium synthesized based on a high level input. In a preferred implementation, the network 10 can be used selectively for inference or generation, and in some variations can facilitate both modes of operation simultaneously. When the network 10 is used for inference applications, the operation of the network 10 preferably starts from sample data that has been reduced, converted or extracted into data features. Data features are preferably a specification of an attribute and its value. A feature vector is preferably a set of features for an instance of a data sample. For example, if applying the network to inference of image data, the image may be subdivided into a plurality of image blocks, and the pixel patterns in the plurality of blocks are used as the features. The input data features are preferably transmitted, fed into, or directed to corresponding child feature nodes of the network 10. In other words, the data features are directed to the child feature nodes of the lowest layer of sub-network 100. In inference operation, the nodes preferably operate on the information and propagate the node selection/processing through the hierarchy of the network 10 until an output is obtained from a parent feature of a top-layer sub-network 100. A combination of propagating information up in the hierarchy (to higher parent layers) and downwards (towards the final child features). Projecting downward in the hierarchy during inference allows the network to increase accuracy by using the imagination/generation functionality to compare the conclusions of inference against the input data to the input child features. In inference, the output is preferably the inferred information. For example, if inference is used in object detection for images, the output may be identification of a detected object. When the network 10 is used for generation applications, the operation of the network 10 preferably starts from a general generation request that is directed, fed, or delivered to the parent feature nodes of the top layer sub-networks 100. In generation operation, the nodes preferably operate on the information and propagate the node selection/processing down the hierarchy of the network 10 until an output is obtained from the child feature nodes of the bottom-layer sub-networks 100. More explicitly, the top layer sub-networks 100 generate samples at the same time. The output samples of the top layer sub-networks 100 determine which lower layer sub-networks 100 are active. Samples are then generated from the lower layer sub-networks 100 concurrently. This output determines the active sub-networks 100 at an even lower layer. This pattern continues through the layers of the network 10 until finally samples are generated from the lowest layer of sub-networks 100. In generation, the output is preferably a simulated output. For example, if the network 10 is used in image generation and the input was the name of an object, the output is preferably an image representative of that object name. More preferably generation and inference involve a hybrid or mixed input approach. The generation operation may additionally rely on input to the child feature nodes that is partially complete, noisy, distorted, from previous instances, or can otherwise serve as a general guide to the generation process. In one variation, generation preferably includes the system obtaining image input for half an image. The half image input is entered into the child features. Then the network 10 is prompted generate possibilities for the other half. In some variations, a network 10 may include sub-networks connected such that the connection skips a layer. The outputs of the layer-skipping sub-network 100 will preferably become involved in selecting active sub-networks 100 when the other sub-networks are feeding into the corresponding layer.

Figure 3:
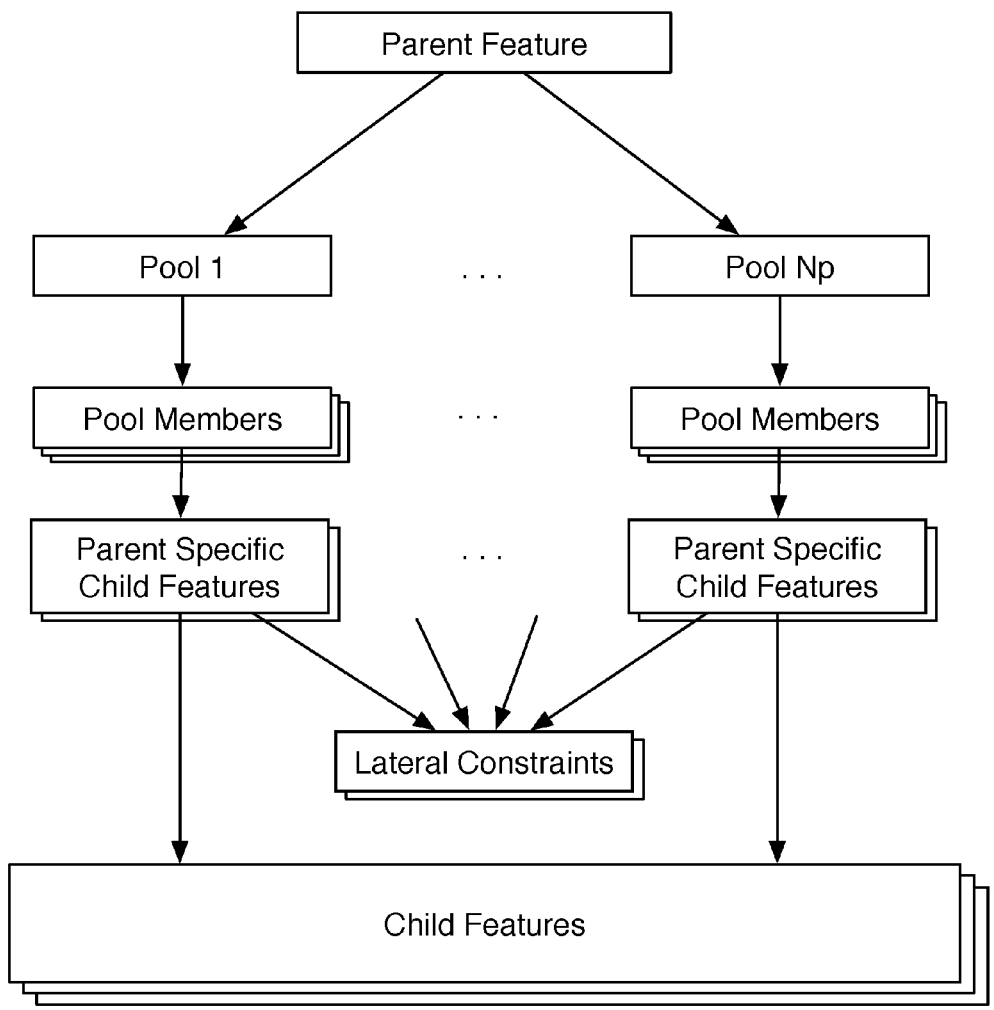
FIG. 3 is a schematic representation of a sub-network of a preferred embodiment.

As shown in FIG. 3, the sub-network 100 functions to provide node selection operation between a parent feature and a child feature. The sub-network 100 is the basic building block of the network 10. The sub-network 100, in the case of generation, is preferably mapped or networked from a higher level feature to a set of lower level features, such that the lower level feature activity (e.g., visual features of an image) is determined by the activities of a higher level feature (e.g., object name). In the case of inference, the sub-network is preferably mapped or networked from lower level features to higher level features, such that the higher level feature activity (e.g., object name) is determined by the activities of a lower level feature (e.g., visual features of an image). The general architecture of a sub-network 100 preferably includes a single top level node that is a parent feature node 110. The parent feature node 110 (PF1) preferably includes connections to at least two pool nodes 120 (P1 and P2). Each pool node 120 preferably includes connections to a plurality of PSCF nodes 130 (X1, X2, X3, X4, X5, X6). Constraint nodes 140 (C1, C2, C3) may additionally be within a sub-network 100. The constraint nodes 140 preferably connect to other PSCF nodes 130. The constraint nodes 140 define limitations, rules, and restrictions between the at least two PSCF nodes 130. The PSCF nodes 130 preferably connect to a child feature node 150 (CF1, CF2, CF3, CR4, CF5, CF6). The instances of sub-networks 100 within the network 10 may or may not share commonalities with other sub-networks. The functional operation of each node can vary in number and configuration of connections, connection weighting, and/or any other aspect. In some edge cases, a sub-network may not include only one node selection option. In one exemplary edge-case, the sub-network can be defined with no selection options so that activation of the parent-feature results in activation of the child feature. For example, the parent feature node may connect to one pool, and the one pool then connects to one PSCF node.

The nodes of the network preferably are configured to operate, perform or interact with probabilistic interactions that determine node activation, selection, ON/OFF, or other suitable states. When activated by a parent node, the node will preferably trigger activation of connected child nodes according to the selection function of the node. The nodes preferably represent binary random variables or multinomial random variables as in a Bayesian network, though other suitable node models may alternatively be used. A feature node is preferably a binary random variable node that can have multiple parents and multiple children. Parent feature nodes 110 and child feature nodes 150 are considered feature nodes. When multiple parents are involved (i.e., multiple nodes connected through a parent connection/input connection), the interactions between the parent connections are preferably treated as the super-position of the connections. For example, a child feature node is preferably ON (i.e., selected, activated, etc.) when either of the parent nodes is ON. Multi-parent interactions can be probabilistically modeled in the node using canonical models such as Noisy-OR and Noisy-Max gates. The child connections of a feature node preferably encode the probabilistic relations between the feature and the pools. In a preferred implementation, all pools of a feature are active if the feature is active, but such activation can be modified according to a probability table or any suitable mechanism. Each link from a node to a pool node encodes a probability table of the kind P(Pool|Feature), as shown in the table below.

| Feature | Pool | |
| --- | --- | --- |
| | FALSE | TRUE |
| FALSE | 1-q | q |
| TRUE | p | 1-p |

In the case where the pool nodes are ON when the feature is ON, p and q will be zero. However, other values of p and q may alternatively be used. The pool nodes 120 are preferably treated as binary nodes. The pool nodes 120 preferably have one parent connection that represents the probability table shown above. Pool nodes 120 can have multiple connections to child nodes. In one variation, the child node connections represent instant-by-instant connections. Instant-by-instant connections preferably implement an OR selection function over the pool members with associated probabilities. Put another way, the instant-by-instant connections represent a multinomial random variable connection. For example, let there be Npm pool members in a particular pool. Consider a binomial random variable M that takes on values1 . . . , Npm. The outgoing links from the pool node 120 represent the probability distribution P(M|Pool). Considered in sequence the P(M|Pool) defines the probability that a particular pool member will be chosen as the starting member for a sequence. Subsequent pool members are then generated in temporal sequence by following the temporal selection functions (i.e., transition function) of that pool member until an endpoint is reached or operation of the network resolves. The pool members (also modeled as possible activated sets of PSCF nodes 130) are preferably configured to act as binary random variables, at least one of which gets selected when a pool is selected according to the distribution P(M|Pool). The pool-members represent functional combinations of child-features. For example, pool-member 1 could be child-feature 1 and child feature 2. Constraint nodes are preferably treated as binary nodes whose observations are instantiated to 1. The probability tables used in these constraint nodes implement the kind of constraint that is enforced between the parent node that connects to the constraint node. Constraints are often AND or OR constraints but can be any suitable selection function. The constraint nodes may additionally be nodes with greater than pair-wise connections.

The parent feature node 110 functions as a high level feature node. In generation operation mode, the parent feature node 110 is the input of the sub-network 100. In inference operation mode, the parent feature node 110 is the output of the sub-network 100. The parent feature node 110 is configured to implement a selection function when activated. Selection functions are preferably logical functions such as a Boolean-based selection function for AND, OR, NOT, XOR operations of node selection. For example, if P1 and P2 are pool nodes of PF1, and PF1 is configured for an AND selection function, then activation of PF1 activates P1 and P2 pools. The selection function may include a randomized selection mechanism for determining selecting between different options such as if the operator is an XOR and only one connected node can be selected. Additionally, randomized selection may be biased or weighted according to node connection weighting of the connections between the parent feature node 110 and the pool nodes 120. Selection functions may alternatively be probabilistic selection functions or any suitable function used in selecting a connection option.

The pool node 120 functions as a node for selecting from a set of child features. Child features associated with a pool node 120 preferably share a relationship, have a correlation, or are variations of one another. For example, a pool may be for different variations in position of a pixel pattern. Described another way, the PSCF nodes 130 are preferably an invariant representation of variations of a feature. In FIG. 3, P1 is an invariant representation for 3 different translations of the vertical line, and P2 is an invariant representation for three different translations of a horizontal line. Herein, the term pools may be used to refer to the possible set of PSCF nodes for a particular pool node 120. The possible set of PSCF nodes 130 is preferably any PSCF node 130 with a connection to the pool node 120. The pools may be constrained. For example, members of a pool can be the set {a, b and c, d, e} where a, b, c, d, e are child features. Similar to the parent feature node 110, the pool node 120 is configured to implement a selection function when activated. The selection function can be any suitable function but is preferably a logical operator as described above for the parent feature node 110. The selection function can similarly be randomized, biased and/or weighted. The selection function of the pool node 120 preferably selects, triggers, activates, or otherwise signals the corresponding PSCF node(s) 130. Additionally, the selection function may be limited or overridden based on activated constraint nodes Activated constraint nodes may define which node is selected within a pool based on the selection of a PSCF node 130 (one connected through a constraint node). Similarly, it may determine the set of possible PSCF nodes 130 for a pool node 120 and/or determine the weighting or preference of the pool nodes 120. Pool nodes 120 within a sub-network can be sequentially evaluated such that constraint nodes maybe applied to other pools when appropriate.

The PSCF node 130 functions as options of invariant feature options. A PSCF node 130 maps to one child feature, and a PSCF node 130 has only one parent pool node 120. PSCF nodes 130 may additionally be connected or coupled with a constraint node 140. The constraint node 140 preferably defines relationships between multiple PSCF nodes 130. The constraint nodes 140 preferably connect to other PSCF nodes 130 of a different pool, a different time, and/or a different sub-network 100. PSCF nodes 130 are preferably not shared between sub-networks. Child feature nodes 150 (which may be the parent nodes of lower sub-networks) however may share connections to multiple sub-networks.

Figure 14:
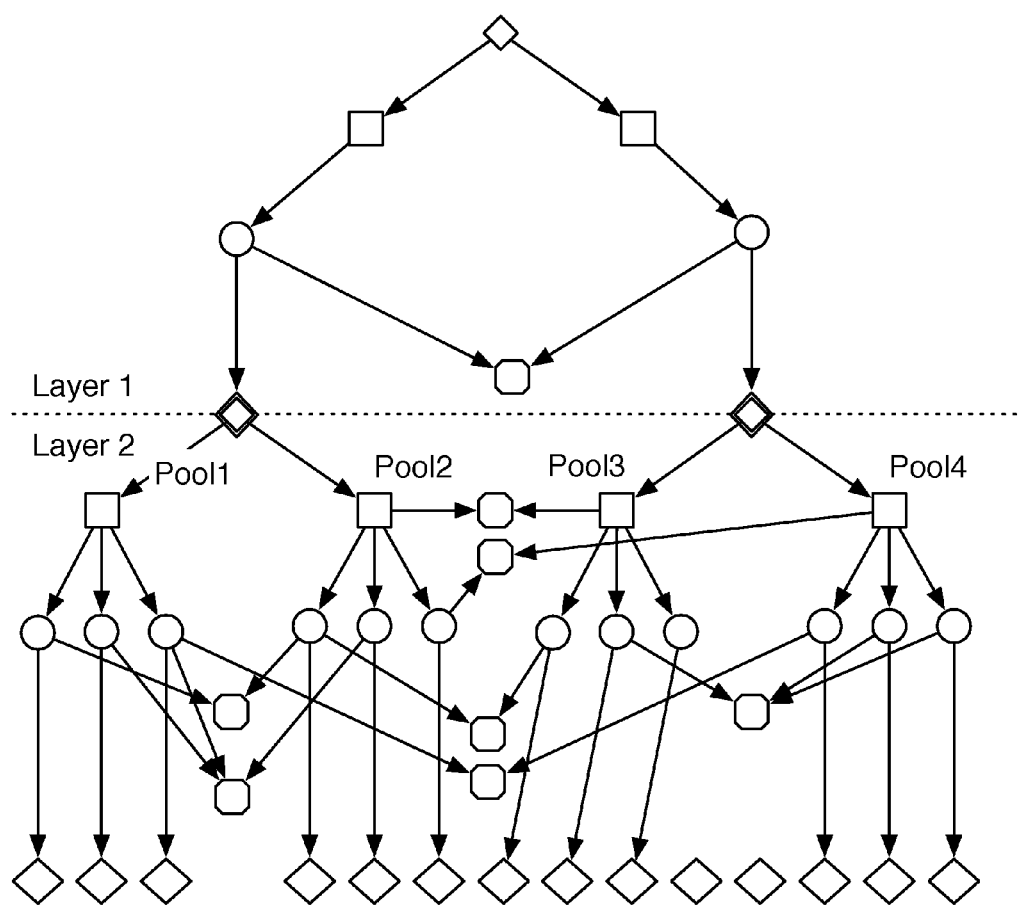
FIG. 14 is a schematic representation of a network with a variety of constraint nodes.

The constraint node 140 functions to restrict the kinds of patterns that are allowed in the sub-network 100. The constraint nodes 140 preferably connect to at least two PSCF nodes 130. Greater than two PSCF nodes 130 may alternatively be connected through a constraint node. The constraint node 140 may additionally be between any suitable types of nodes. The constraint node 140 could be between pool nodes 120. The constraint node can additionally be between two types of nodes. For example, a constraint node can connect a PSCF node 130 and a pool node 120. Herein, the variation where the constraint node connects PSCF nodes is shown as the preferred implementation, but the constraint node can be used in enforcing constraints between any set of nodes (of any type) in the network 10. The constraint nodes may be between pool nodes, between a pool node and a PSCF node, or any suitable nodes of the network as shown in FIG. 14. The PSCF nodes 130 are preferably not of the same pool and in some cases are not in the same sub-network. The constraint nodes 140 preferably connect PSCF nodes 130 of the same layer, but they may alternatively connect sub-networks 100 in different layers. Additionally, any suitable PSCF node 130 may have a connected constraint node 140 and have any suitable number of connected constraint nodes 140. Constraint nodes can enforce restrictions, rules, and constraints within selection of nodes in other pools, in other sub-networks 100, and/or in different times. The network 10 is preferably evaluated in an ordered fashion such that PSCF nodes 130 that are connect through a constraint node 140 are preferably not evaluated simultaneously. When a first PSCF node 130 is active or selected, any constraint nodes 140 connected to the first PSCF node 130 is activated. Subsequently, restrictions of the constraint node 140 are activated/enforced on the connected PSCF nodes. The constraint node 140, similar to other nodes, may have a selection function that determines how it activates PSCF nodes. The constraint node 140 preferably impacts how a pool node 120 can select PSCF nodes. In one variation, the selection function of the constraint node 140 may be an AND logical operator such that it enforces selection of the connected PSCF nodes if one is active. In another variation, the selection function of the constraint node 140 may be an OR logical operator such that it modifies the possible PSCF nodes within a pool. Any suitable selection function may be used. Some constraint nodes 140 may have a basic or simple constraint wherein activation of one node corresponds to selection of a second node. These may be represented as a direct connection without a node since the selection logic is a direct correspondence between the nodes. Preferred variations of the constraint nodes 140 can include the lateral constraint node 142, the external constraint node 144, and the temporal constraint node 146.

The lateral constraint node 142 functions to restrict the kinds of patterns of a sub-network based on the interaction between pool nodes 120 of the sub-network 100. A lateral constraint node 142 is preferably an enforced rule or node connection between a PSCF node 130 of a first pool node 120 and at least a second PSCF node 130 in a second pool node 120, where the first and second pool nodes share a common parent node 110. The lateral constraints are used so that different configurations that are generated correspond to horizontal translations of a corner. In this case, the parent feature can be considered as representing the different translations of the corner. That is, the parent feature has a representation of the corner that is invariant to translations of the corner.

Figure 4:
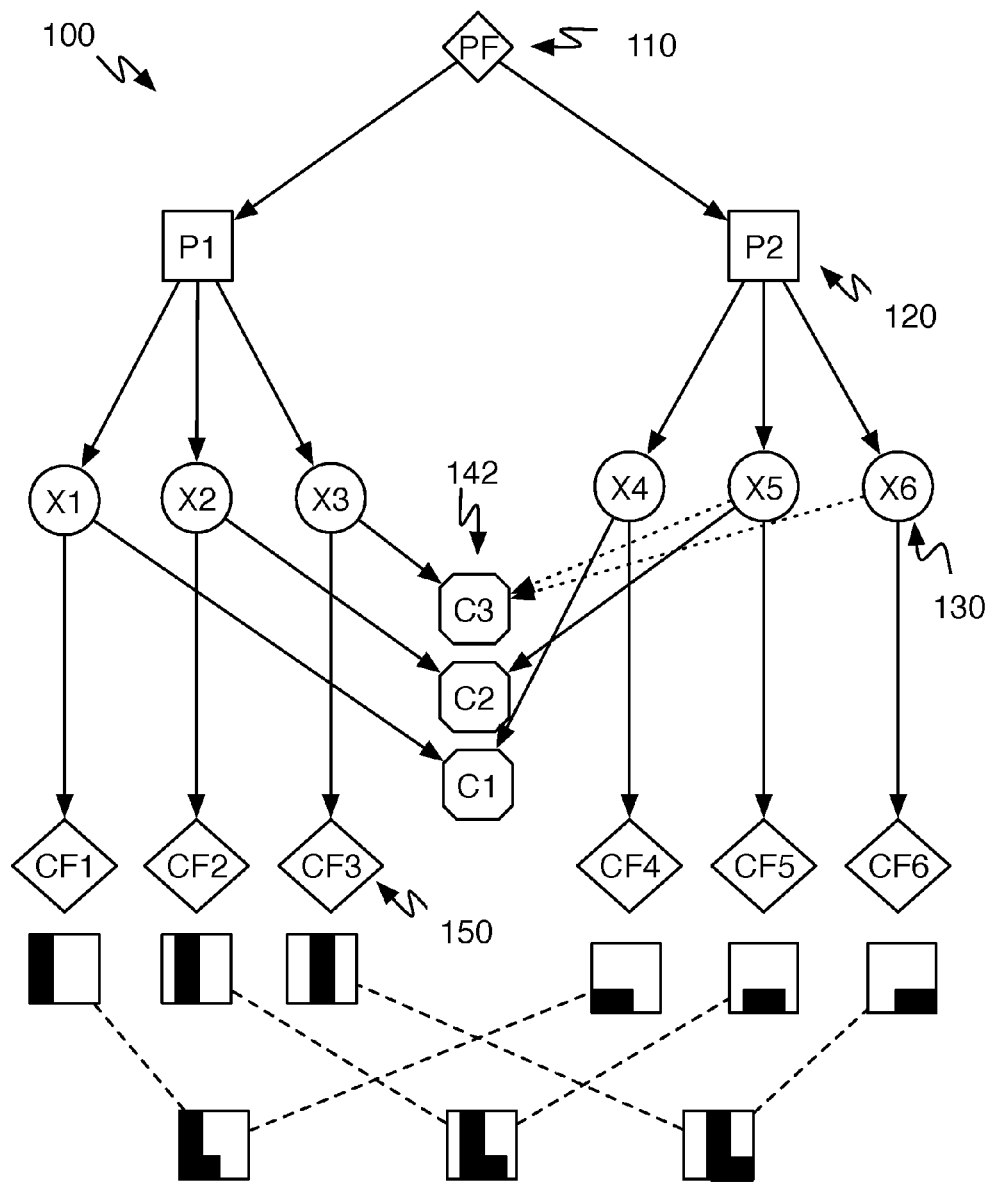
FIG. 4 is a schematic representation of a sub-network for generating patterns with lateral constraint nodes of a preferred embodiment.

As shown in FIG. 4, an exemplary implementation of a sub-network may include two pool nodes 120 (P1 and P2), six PSCF nodes 130 (X1, X2, X3, X4, X5, X6) with three a piece for each pool node 120, three lateral constraint nodes 142 (C1, C2, and C3) connected to a pair of PSCF nodes 130, and six child feature nodes 150 (CF1, CF2, CF3, CF4, CF5, CF6) individually connected to a PSCF node 130. The selection function of the parent node is an AND operator such that P1 and P2 are both selected at the same time.

Selecting the parent-feature automatically selects the pools P1 and P2 connected to the parent feature node. P1 and P2 are both configured as XOR logical operators for a particular time instant. As an XOR operator, only one descendent (i.e., connected PSCF node 130) is selected at a time. In the mode where each pool node P1 and P2 randomly selects one of its PSCF nodes, the lateral constraint nodes 142 and their connections encode the constraints that are imposed between the child-feature selections of different pools of the same parent. In this implementation, C1 and C2 are AND operators. So if X1 is activated, the connections of C1 enforces activation of X4. Similarly, if X2 is activated, the connections of C2 enforces activation of X5. C3 may be implemented as an XOR. If X3 is activated, the connections of C3 between X3, X5, and X6 will prevent the selection of X5 and X6 by P2 since only one of X3, X4, and X5 can be selected. These serve only as simple exemplary connections and selection functions. Each node may have any suitable function and connection architecture. If, in this example, the lateral constraint nodes 142 were not in place, each pool would be allowed to select a child feature independently of each other, and the parent feature will correspond to an invariant representation of nine different patterns that correspond to all the combinations that can be generated by selecting one feature from P1 and another feature, independently, from P2. In some sub-networks, a constraint node 140 may not be used.

Figure 5:
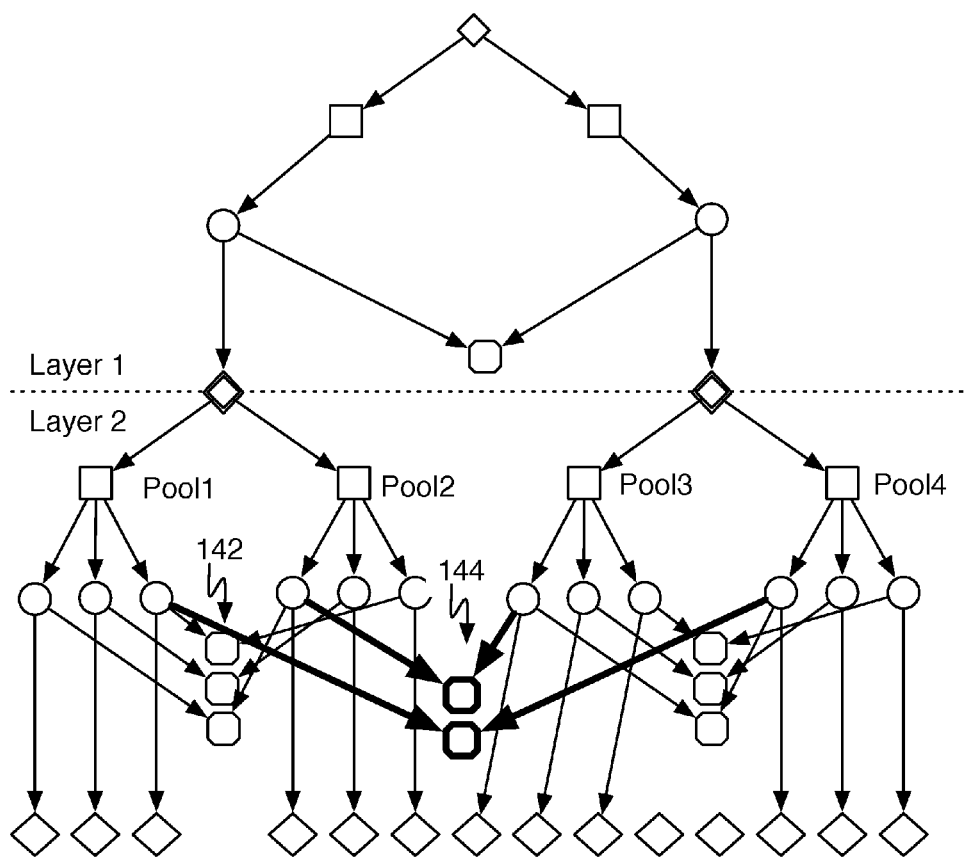
FIG. 5 is a schematic representation of a sub-network for generating patterns with external constraint nodes of a preferred embodiment.

The external constraint node 144 functions to enforce invariant patterns across different sub-networks 100. Similar to how lateral constraint nodes 142 can ensure that the representations in different pools are consistent with each other by imposing constraints on which PSCF nodes 130 of one pool node 120 are allowed to go with PSCF nodes in another pool, external constraint nodes 144 can maintain compatibility across the hierarchy. External constraint nodes 144 preferably create connections, rules, or other constraint mechanisms that can create selection interactions between two different sub-networks 100. The external constraint nodes 144 preferably connect at least two PSCF nodes 130. Similar to other constraint nodes, they enforce a selection function when activated. As shown in FIG. 5, a hierarchical network 10 can be configured with at least a top layer sub-network 100 that provides input to at least two lower layer sub-networks 100. When generating a sample from the network, the generated features of the top layer sub-network 100 are used as inputs for concurrently generating samples from the lower layer sub-networks 100. Without external constraints imposed, samples generated by pool1 and pool2 have no coordination with samples generated by pool3 and pool4. However, the external constraint nodes shown in FIG. 5 in bold provide a mechanism for implementing the coordination between the pools of the sub-networks 100 in the lower layer. As shown in FIG. 5, the PSCF nodes 130 can have more than one type of constraint nodes enforced on them. The lateral constraint nodes 142 impose coordination between PSCF nodes 130 in different pools of the same network, and the external constraint nodes 144 impose coordination between PSCF nodes 130 in different sub-networks 100. The constraint nodes 140 are preferably set to not result in conflicts (e.g., where one constraint activates a node and the other specifies it should not be activated). Ranking of the constraint nodes 140, or heuristics for the order of enforcing constraint nodes 140, or other suitable rules may be used resolve conflicts and races between constraint nodes 140.

Figure 6:
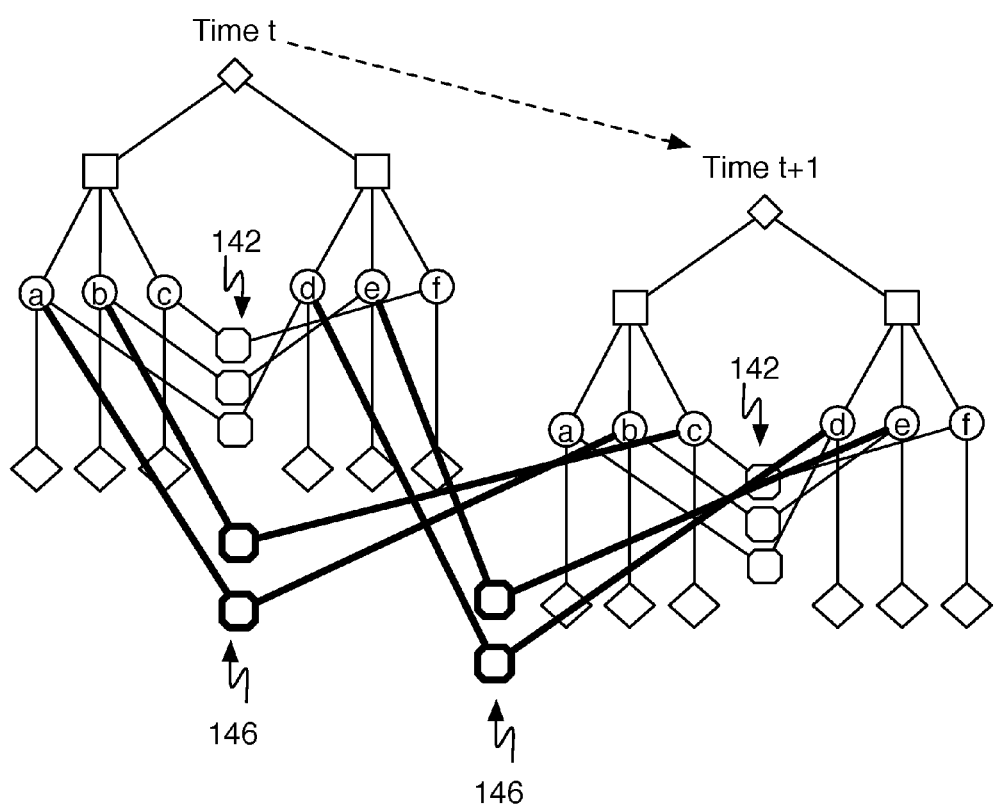
FIG. 6 is a schematic representation of a sub-network for generating patterns with temporal constraint nodes of a preferred embodiment.

The temporal constraint node 146 functions to enforce relationships across networks 10 and sub-networks 100 operating for other instances of time. On a basic level, the members of a pool (e.g., the PSCF nodes 130 with a shared parent pool node 120) can have relationships that specify the order they occur in time. The temporal constraint nodes 146 are preferably simple direct connection constraints, where activation/selection of one node enforces the selection of a specified node in a second instance. The temporal constraints 146 may not have strict ordering. The temporal constraint nodes 146 can specify a set of possible pool-members that can occur at the second time instant, given the pool-member or set of pool-members that occurred at the first time instant. In an alternative description, the constraint nodes 140 can function analogous to specifications in a Markov chain. As shown in the exemplary temporal constraints of FIG. 6, the activation of PSCF node 'a' at time t goes to PSCF node 'b' at time t+1, and PSCF node 'b' at time t goes to PSCF node 'c' at t+1. In the case of the first pool, this example represents the sequence of 'a' to 'b' to 'c' using a representation of two time slices. For the second pool, the temporal constraint nodes define the sequence of 'd' to 'e' to 'f'. The selection function of the temporal constraint nodes 146 can similarly be arbitrarily complex as with other nodes. For example, when node a is active at time t, nodes b or c can be active at time t+1. Higher order temporal relationships may additionally be used. The temporal constraint nodes 146 preferably define relationships going forward in time to a subsequent instance, but the temporal constraint node may define relationships between multiple instances. For example, a temporal constraint node may define constraints from one PSCF node to networks of three different time instances. Additionally, the temporal constraint nodes 146 in some variations may even define retroactive constraints to previous instances. For example, inferring detection of one pattern at the current time may strengthen cues for detection of a pattern at a previous time. Here, an instance of a network 10 is preferably the operation or use of the network 10 for different time instances. The temporal constraint nodes 146 may be of particular use for generation or inference applications on time based media such as video, audio, or computer graphics. While here the temporal constraint node is specific for time-based applications, similar constraint nodes 140 may be defined between different instances of a network 10 along other dimensions depending on the problem field or use-case.

Figure 7:
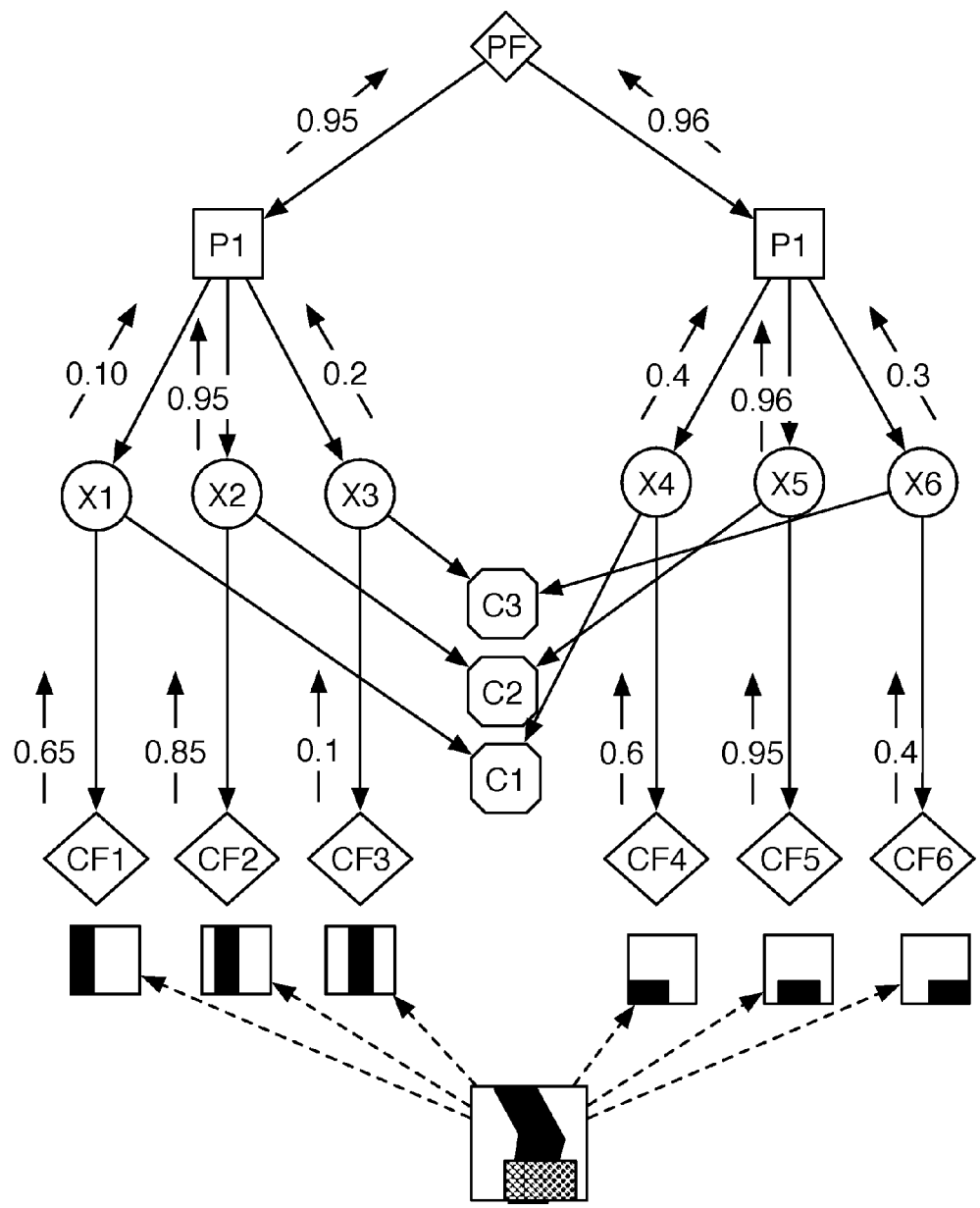
FIG. 7 is a schematic representation of a sub-network for inferring patterns of a preferred embodiment.

As shown in FIG. 7, the network 10 can be configured for inference or recognition use case scenarios. When the network 10 is configured for inference, the propagation of node selection flows up the hierarchy from data features (i.e., the lowest child features), and in essence operates the network 10 in an analogous manner but in a reverse manner. Instead of going from high level features to detailed features, detailed features are used to infer general features in upper layers. In application, inference may be used to take image features (image properties or sub-image components) and extract information based on those features. An inference-configured network 10 preferably uses posterior distribution (i.e., probability of a parameter given the evidence) of the nodes and the supplied evidence in the child nodes to propagate the activation, selection, and ON/OFF state up the hierarchy. This can be characterized as a variant of a belief propagation algorithm, which may be used to derive an approximation of posterior distributions at the nodes of interest using local message passing. Since all nodes in the network are preferably treated as binary, the posterior of a node is the mechanism through which a node specifies the probability of the node being ON or OFF given the evidence (child nodes). Nodes are preferably configured to pass messages through the shown connection channels between nodes. The connections may be bidirectional conduits for messages. Messages that flow upstream are likelihood messages and downstream probability messages. As shown in FIG. 7, a sub-network may propagate messages based on an input image. The messages in this example are representative of the likelihood of the evidence given that the node corresponding to the origin of the message is ON. So node CF2 has a higher likelihood compared to node CF1, because the representation of CF2 is better aligned with the input evidence. The likelihood of a pool is the maximum over the likelihoods of pool members. When the network is presented with a sequence of inputs corresponding to subsequent time instants, the network can propagate messages in time and do temporal inference. In which case, the evaluation of different nodes will be representative of the probabilities given a sequence of evidence.

Figure 8:
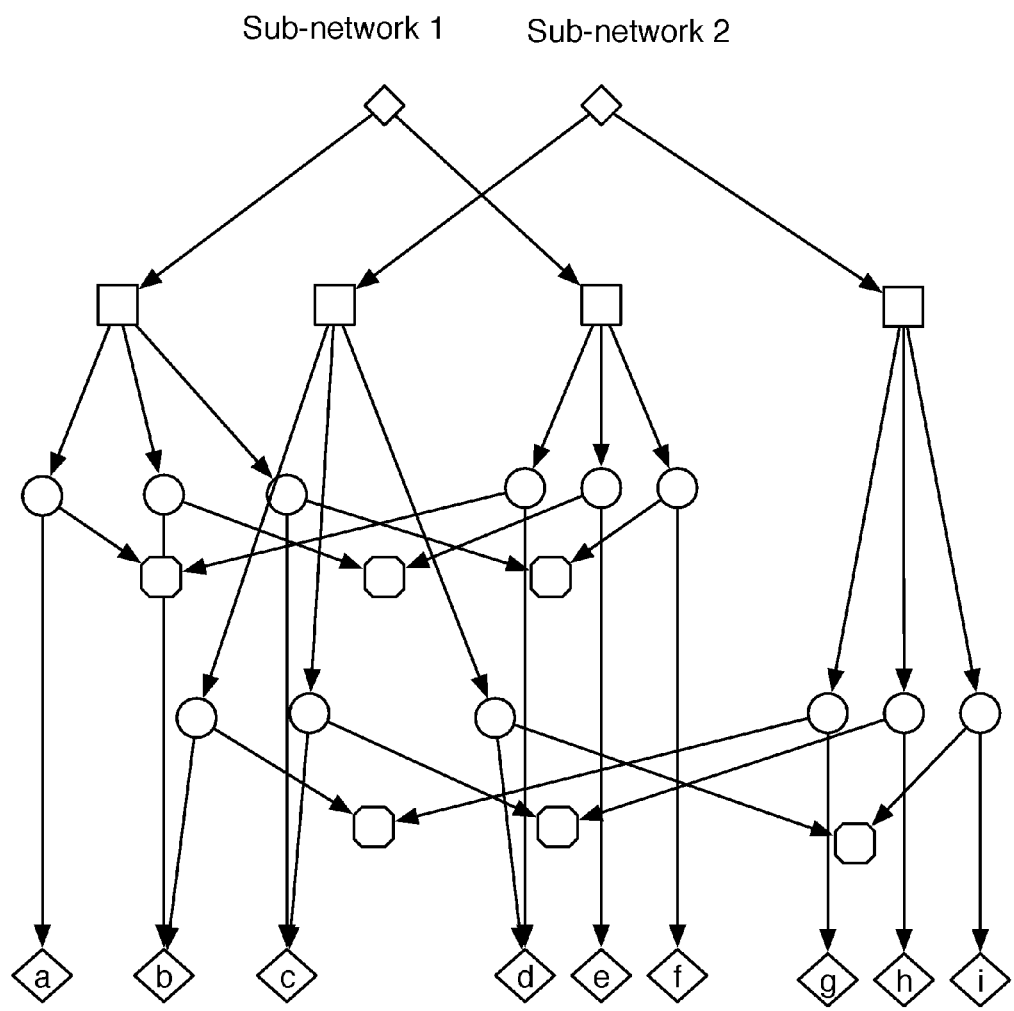
FIG. 8 is a schematic representation of a network variation with two sub-networks sharing child feature nodes of a preferred embodiment.
Figure 9:
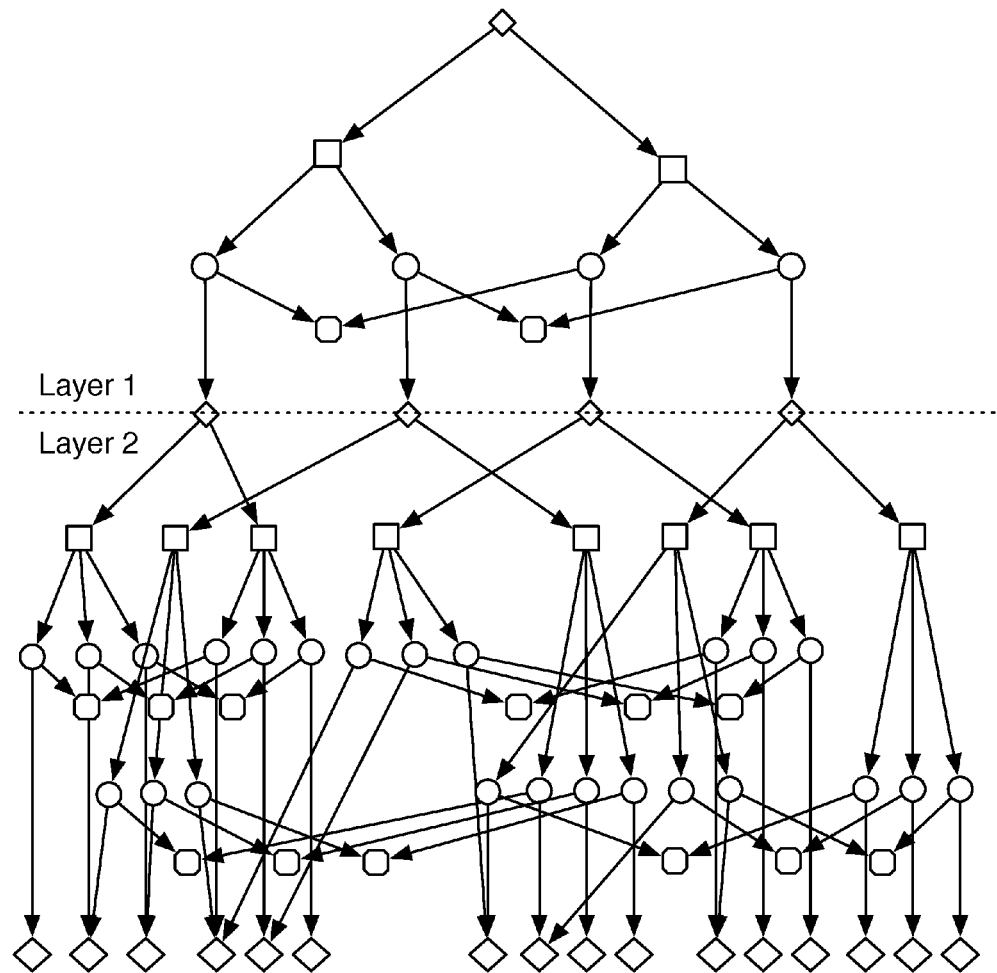
FIG. 9 is an exemplary schematic representation of a network variation with multiple sub-networks divided between two layers, some of which share child feature nodes.

As shown in FIG. 8, the network 10 may additionally include at least two sub-networks 100 with overlapping, overlaid, or shared child feature nodes, which functions to introduce multi-parent interactions. Shared child features of two sub-networks preferably include two PSCF nodes of two different sub-networks having child connections to the same child feature node. During inference such network architecture can produce explaining-away effects. For example, a feature node 'b' shared by two sub-networks can be used with a Noisy-OR mechanism model such that the two sub-networks can compete for evidence presented to the node. Competitions can come to effect through belief propagation mechanism or similar message passing mechanisms. The sub-networks are preferably individually configured—each sub-network has a separate representation of pool members, constraint connections, and PSCF nodes. A child feature that participates in two different parent features as part of two different sub-networks can have different activation values during generation of patterns and during inference. As shown in FIG. 9, when used recursively, a network, which may be characterized as a recursive cortical network, can form arbitrarily large and complex networks 10.

2. Method for Creating a Neural Network

Figure 10:
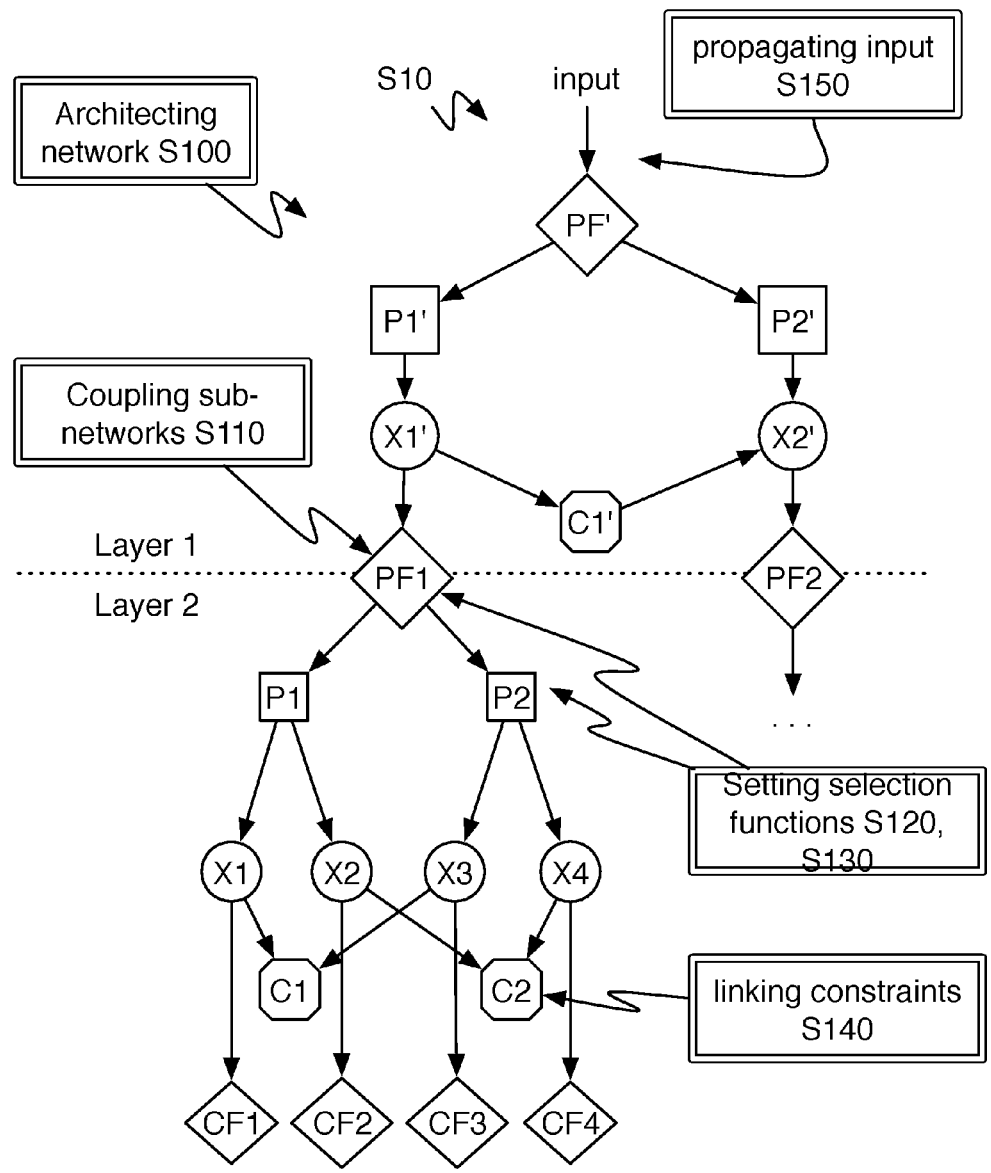
FIG. 10 is a schematic representation of a method for creating a network of a preferred embodiment.
Figure 11:
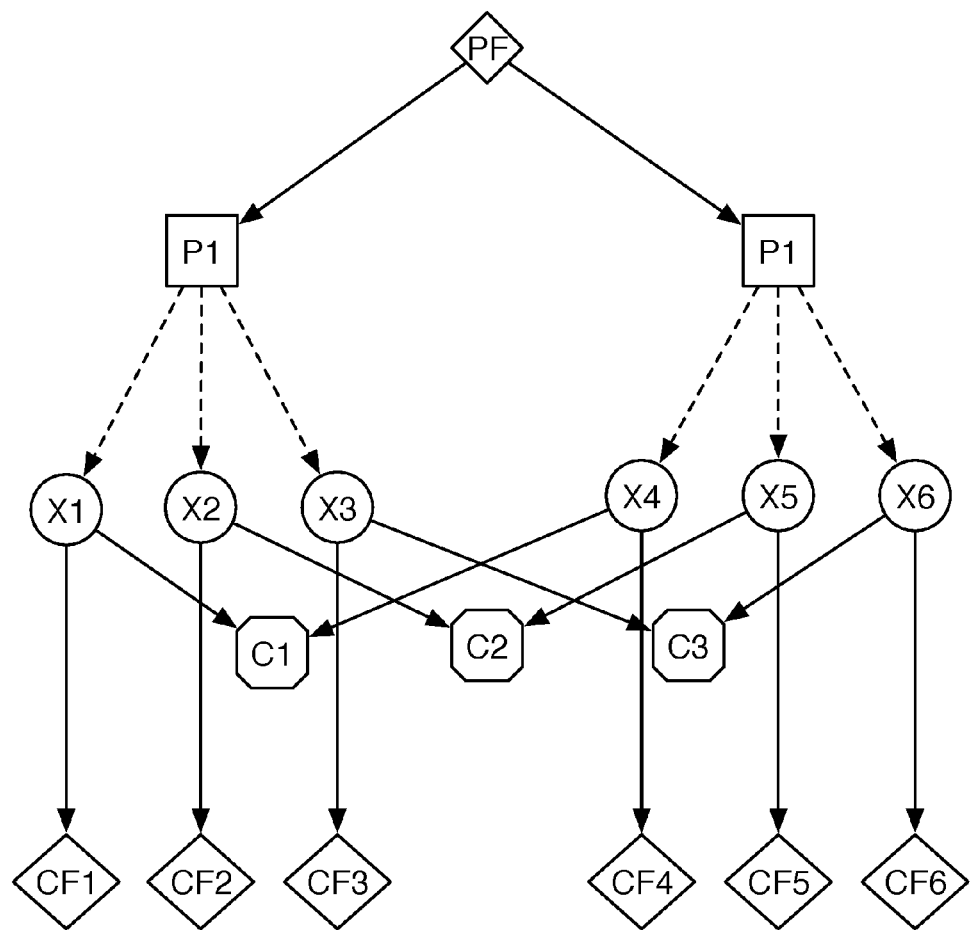
FIG. 11 is an exemplary implementation of a method for creation of a network.

As shown in FIG. 10, a method S10 for creating neural network of a preferred embodiment can include recursively architecting a plurality of sub-networks in a network hierarchy S100 that comprises coupling child feature nodes of a first layer sub-network with the child feature nodes of a parent feature node of a second layer sub-network S110; within a sub-network, setting a selection function of a parent feature node connected to at least two pool nodes S120; within a sub-network, setting a selection function of a pool node connected to at least two parent-specific child feature nodes S130 (PSCF nodes for short); linking at least a pair of PSCF nodes through a constraint node S140; and propagating node selection down the network layer hierarchy in a manner consistent with node connections of the sub-networks and the selection functions of the nodes of the sub-network S150. The method preferably functions to configure, create, manufacture, or transform a neural network to an enabled system. The network created by the method S10 further functions to promote invariance through the use of coordinated connections between lower levels and higher levels; selectivity through constraint nodes; and shared learning through sparse distributed representations of features. The completed network is preferably substantially similar to the system described above, but any suitable variation or alternatives can be incorporated into the method S10. When used for generation, the output feature nodes are preferably connected to assemble features into a generated pattern. In one implementation, the output of child feature nodes is assembled into a generated image. In another implementation, the output of the child feature nodes is assembled into an audio signal. When used for inference, the child feature nodes receive data input. In the implementation, the computed image features derived from image processing techniques are fed into the child feature nodes. Similarly, the input data can be audio, data signals, or any suitable data features.

Block S100, which includes recursively architecting a plurality of sub-networks in a network hierarchy, functions to reuse sub-network patterns in a layered network. The sub-networks preferably interface with each other through the feature nodes: parent feature nodes and child feature nodes. Parent feature nodes are preferably at the top of the network hierarchy, and connections branch out from the parent feature nodes eventually to child feature nodes. A sub-network will preferably have a number of possible child feature nodes. This is a set of nodes that are the leaves of the network, or, as they can alternatively be described, the lower level/layer nodes. Here nodes can be described as artificial neurons, artificial neurodes, processing elements, processing units, or any suitable description of a node of an artificial neural network. The nodes are preferably operative components that include parent connections through which the node receives signals to activate and child connections through which the node signals connected nodes to activate. Activation may additionally be described as selection, setting state of a node (e.g., ON or OFF state), or any suitable output. The activation signal is preferably binary but it may have any suitable number of states. The sub-networks preferably comprise a parent node, a pool node, a PSCF node, optional constraint nodes, and child features, but such node classification and type may be suitably adjusted. For example, PSCF nodes may be functionally combined with the child feature nodes when configuring into physical logic blocks in a processor. The sub-networks are preferably individually configured—each sub-network has a separate representation of pool members, constraint connections, and PSCF nodes. In other words, each sub-network is often not identical to each sub-network, but instead includes customized connections, number of nodes, constraints, and other individually set configuration. However, the architecture patterns of a sub-network are preferably consistent in the sub-networks. Setting of the nodes and the connections is preferably automated either through training data, live data, or historical data. The setting of nodes may additionally be semi-automated with adjustment and customization through user input. The setting of a network may be static or continuously or periodically updated. Any suitable number of layers of sub-networks may be used. Additionally, recursively architecting a plurality of sub-networks may include architecting at least a second network for a second time instance; architecting sub-networks with overlapping, overlaid, or shared child feature nodes.

Block S110, which includes coupling child feature nodes of a first layer sub-network with the child feature nodes of a parent feature node of a second layer sub-network, functions to connect sub-networks through the parent feature nodes and the child feature nodes. Sub-networks are preferably organized into layers. Sub-networks in the same layer preferably have a parent node connected to the same parent sub-network or at least a sub-network in the same layer as the parent sub-network. The hierarchy of sub-networks preferably starts at the highest level with open parent feature node ports and expands downward to the lowest level with open child feature node ports. Sub-networks may be separated into different layers where a "child" sub-network can descend from a "parent" sub-network. In one variation, however, a sub-network may be configured to interact as sub-network in an arbitrary layer. This can also be achieved by having intermediary special case sub-networks that have a simple network where the selection function is an identity function where there is one parent node, one pool, one PSCF, and one child node. If the parent node is activated, the child node is activated. Any suitable number of layers and number of sub-networks within any single layer may be configured. In one variation, at least one child feature node of a first sub-network may be shared with a second sub-network in the same layer, as shown in FIGS. 8 and 9. Additionally, the method may include setting posterior distribution models of a node within the nodes, which functions to enable belief propagation for inference or detection use-cases. The posterior distribution preferably provides the probability of a node being activated (i.e., ON) given the evidence (e.g., the child nodes).

Block S120, which includes setting a selection function of a parent feature node connected to a pool node within a sub-network, functions to define and configure the activation of pools of a parent feature. Preferably, the selection function of a parent feature node is an AND function that selects all connected pool nodes. Alternatively, the selection function can be an XOR function (that only selects one of the pools), OR function (that randomly selects at least one of pool nodes), or any suitable logical operator function. Additionally or alternatively, probabilistic modeling may be incorporated into the Boolean logic function, probabilistic selection function, or other suitable selection function. Different pool nodes may receive reinforced/preferential weighting or de-prioritized/reduced weighting. A random selection mechanism may be used in cooperation with the probabilistic modeling to select a pool node. A selection function may be operation instructions encoded in a digital medium. Alternatively, the operational instructions may be encoded into the physical processor gate architecture.

Block S130, which includes within a sub-network setting a selection function of a pool node connected to at least two PSCF nodes, functions to define and configure the activation of feature nodes related, associated, or otherwise child features of the parent node. The selection function is preferably configured to be triggered upon activation by the parent feature node. Preferably the selection function of a pool node is an XOR function that selects one of the child PSCF nodes. The selection function may be any suitable alternative function as discussed above. One or more PSCF node may be selected based on the operation of the selection function. A pool of PSCF nodes is used to set an invariant pattern of a group of features. Depending on the layer of the sub-network, the invariant pattern may be a can have any suitable level of abstraction. For example, a pool of PSCF nodes in a lower layer may correspond to different translations of a rectangle pattern of pixels along one dimension. An exemplary upper layer may include a pool of PSCF nodes that correspond to different types of animal legs. The PSCF nodes can correspond to any suitable invariant pattern collection.

Block S140, which includes linking at least a pair of nodes through a constraint node, functions to define interactions between isolated portions of the network. The constraint node is preferably between at least two PSCF nodes, but may alternatively be between any set of nodes. Linking the PSCF nodes through a constraint node preferably allows selection of one node to impact and alter behavior of a selection function of another pool. As described above, three preferred types of constraint nodes include a lateral constraint, an external constraint, and a temporal constraint. These constraints are preferred forms of constraints for spatial and/or temporal forms of data. Other forms of constraints may additionally or alternatively be used if an alternative network or sub-network accounts for other data dimensions. The constraint node can additionally include a selection function as described for other types of nodes. The selection function can similarly be set. Any suitable number of input and output connections may be configured for a constraint node. In basic implementation, the constraint node is an AND logical function that enforces the selection of a connected PSCF node when a connected PSCF node selects or activates the constraint node. The constraint node may include defined input connections, which defines which PSCF node is used to activate the constraint node. Alternatively, the constraint node may use all connections of the PSCF nodes in a mixed mode, wherein the first signal that indicates activation or selection triggers the constraint node to enforce selection constraints on the remaining connected PSCF nodes (where the pool node has not yet selected a PSCF node).

In one variation, Block S140 can include linking a first node of a first pool to a second node in a second pool, wherein the first pool and second pool share the same parent feature node in the same sub-network. Such a constraint between sibling pool members is preferably defined as a lateral constraint. The lateral constraint node is preferably between at least two PSCF nodes, but may alternatively be between any set of nodes. In another variation, Block S140 can include linking a first node of a first sub-network to a second node of a second sub-network, where the first sub-network and second sub-network are different sub-networks. Such a constraint node between different sub-networks is defined as an external constraint node. The first and second sub-networks are preferably in the same hierarchical layer within the network but may alternatively be in different layers. Similarly, the external constraint node is preferably between at least two PSCF nodes, but may alternatively be between any set of nodes.

In another variation, Block S140 can include linking a first node of a first network to a second node in a second network, wherein the first network is specified for a first instance (e.g., time t) and the second network is specified for a second instance (e.g., time t+1). Such a constraint node between different times is a temporal constraint node. The first and second instance can be the evaluation of an equivalent network but just at two different time periods. The temporal constraint node is preferably between at least two PSCF nodes, but may alternatively be between any set of nodes. The first and second instance may alternatively be evaluation of two different networks assigned to a sequence of network evaluations. In yet another variation, the first and second instance may be defined through the child features (where a set of features are for one time period and a second set of features are for a different time period). In this variation, the temporal constraint may also be considered a lateral or external constraint. Additionally, other forms or types of constraint nodes may be employed depending on the unique use-case in which the underlying network architecture is being used.

Block S150, which includes propagating node selection through the network layer hierarchy in a manner consistent with node connections of the sub-networks and with the selection functions of the nodes of the sub-network, functions to activate the network with an input. The network can be used for generating patterns and/or inferring patterns. Generating patterns preferably uses high level or abstract pattern input and transforms, projects, or synthesizes a new or potential object or interpretation. Inferring patterns preferably transforms data representative of physical evidence of objects, events, or meta-concepts into interpretation of patterns that are manifested through the propagation through the network. Generating and inferring modes can additionally at least partially use the other mode to improve, augment, or facilitate generating or inferring pattern output. Similarly, one mode of operation may be used in reinforcing the probabilistic models of nodes in the network. Preferably training data is iteratively or continuously propagated through the system with training engine that updates the probabilistic models according to any suitable heuristic, algorithm, or approach. The propagation of node selection is preferably implemented as described in the methods below but may alternatively use any suitable approach.

An exemplary implementation of the method S10, as shown in FIGURE ii, is a hierarchy of three sub-networks and nodes set with their respective selection functions. The parent nodes are set with AND relationship functions represented by solid arrow connections such that each connection is selected at the same time. Selecting the parent feature automatically selects the pool nodes that are connected to the parent feature node. The pool nodes are set with XOR relationship functions represented by dashed arrow connections. At any particular time, only one descendant is allowed to be selected. Further, the function uses a random selection process to select one of the PSCF nodes. Three lateral constraint nodes use an AND function such that when one of the PSCF nodes is selected the corresponding node in the other pool is selected.

3. Method for Generating a Pattern from a Network

Figure 12:
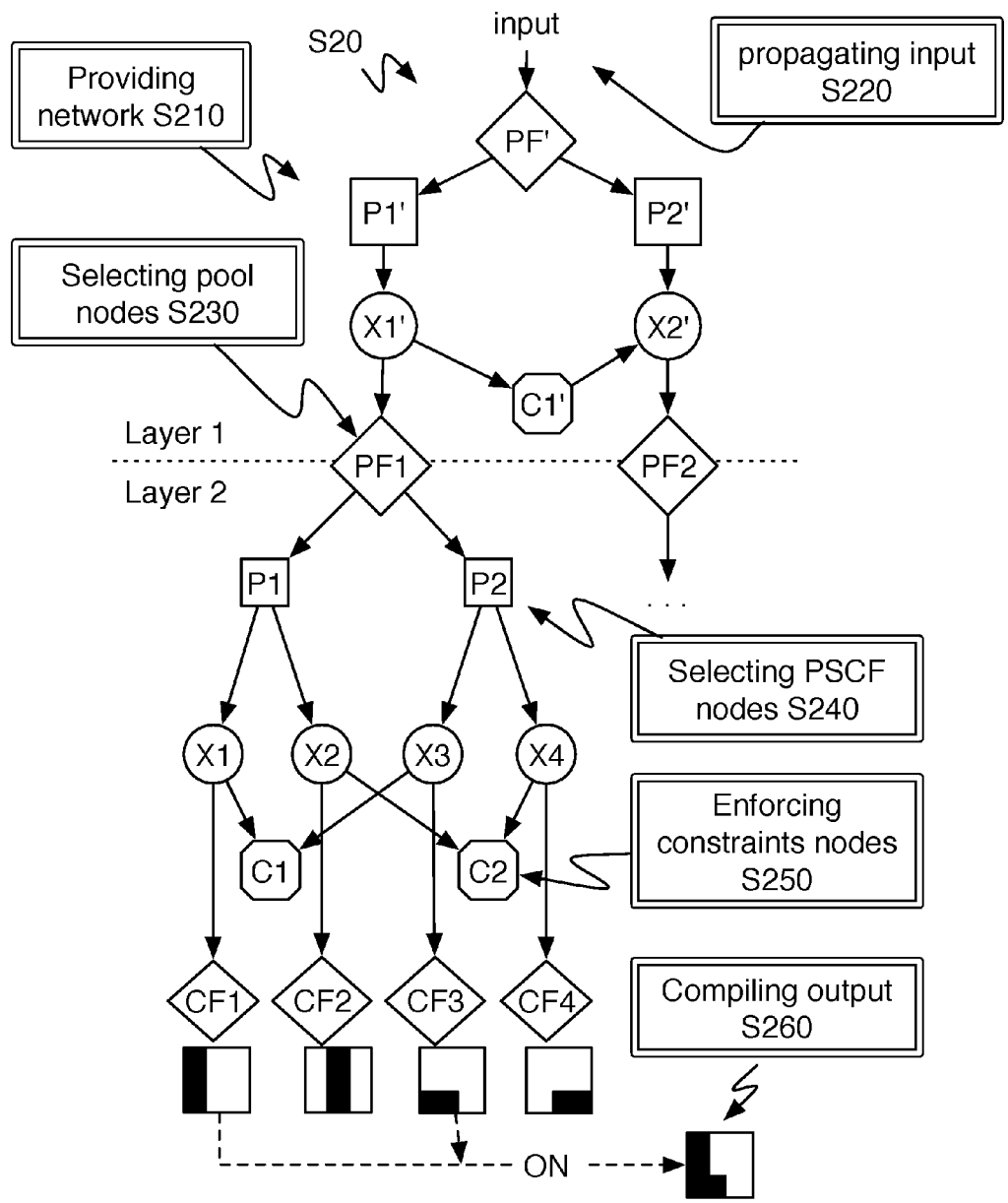
FIG. 12 is a schematic representation of a method for generating a pattern of a preferred embodiment.

As shown in FIG. 12, a method S20 for generating a pattern from a network of a preferred embodiment can include providing a network of recursive sub-networks with a parent feature input node and at least two child feature output nodes S210; propagating node selection through the network layer hierarchy in a manner consistent with node connection of sub-networks of the network S220 that comprises, at a parent feature node, selecting a pool node consistent with a function of the parent feature node S230; at a pool node, selecting at least a first PSCF node that corresponds to a child feature of the sub-network S240; in response to the selection of at least a first PSCF node, enforcing a selection constraint on at least a second PSCF node S250; and compiling the final child features of the network into a generated output S260. The method S20 functions to synthesize, simulate, or produce a pattern based on the network patterns. The network is preferably the neural network or Bayesian network as described above and is operative on a computing device. The method S20 preferably transforms high level input of top layer parent feature nodes into detailed data features that can be assembled or combined from the output of child feature nodes. The method is preferably implemented for a single instance of a network, but the method S20 may additionally be expanded to work periodically or continuously for multiple instances. Similarly, the method may include any suitable adjustments such that a network may cooperatively operate with additional networks. Pattern generation can be applied in various mediums and fields such as computer graphics, speech synthesis, physical modeling, data simulation, natural language processing/translation, and the like. In one implementation, the method S20 may be used to generate imagery based on contextual information. In another implementation, the method S20 may be used to generate synthesis. Pattern generation can be modified to be used in prediction-based applications. Prediction can be considered a special case where the generated content is projecting into a future time. Such implementations may include predicting financial trends or data analytics.

Block S210, which includes providing a network of recursive sub-networks with a parent feature input node and at least two child feature output nodes, functions to implement a recursive cortical network with enforced constraints. The network is preferably a network as described above or as created in method S10. A basic network of any complexity preferably has at least two layers with one top layer sub-network and two sub-networks in a lower layer. The network of recursive sub-networks will preferably be of greater complexity, having multiple layers in the hierarchy. Each sub-network may have any suitable number of child feature nodes from which any number of descendant/child sub-networks may use as inputs in a lower layer. For example, a sub-network in a first layer may have five pools with two, three, four, five, and six connected child nodes, respectively. With a total of twenty child nodes, a second layer may have twenty different sub-networks that use those child feature nodes as inputs to their respective parent feature nodes.

Block S220, which includes propagating node selection through the network layer hierarchy in a manner consistent with node connection of sub-networks of the network, functions to select, activate, turn ON or OFF, or otherwise set the state of nodes in the network. Propagating node selection can include sending an electric signal that acts as a trigger or activator to induce the targeted node to activate appropriately. Propagating node selection can alternatively include sending a message or communication to another node. A protocol may be in place to coordinate the communication/messaging. Propagation of node selection preferably includes a systematic or organized approach to node activation. Initially, pattern parent feature input is received. The parent features are preferably the high-level features, categorization, or other input that form the basis on which a pattern will be generated. The input is preferably delivered to the sub-network(s) in the top layer of the network. The propagation through the network then proceeds: the sub-network of the top layer is processed; the next layer of sub-networks is then processed; and the processing continues where each hierarchical layer of the network is progressively (i.e., sequentially or consecutively) processed. In another variation, at least partial child feature input is received at the bottom child feature nodes. This variation, involves the network performing generation within a portion of the supplied child feature node input. This variation includes receiving seed child feature input (e.g., at least partial selection of child feature nodes), which functions to provide context and a framework for generation. For example, half an image may be supplied, and propagation within the network is used to generate/create/imagine child features for the remaining half of the image. In the special case where there is only one layer (e.g., a collection of sibling sub-networks), the propagation of node selection can preferably happen across the sub-networks either in parallel and/or in sequence depending on configuration. Additionally, there may be ordering of processing of the sub-networks within a single layer. In some instances external constraints may define relationships between two sub-networks so one sub-network is first processed and then the other one is processed factoring in the external constraint. The order may be pre-defined or configured. Alternatively, the processing may be a race condition between the different sub-networks and the first sub-network to complete processing determines the constraint enforcement. Alternatively, they may be simultaneously processed or managed in any suitable manner. Similarly, there may be ordering of processing of nodes within a sub-network. The pools in a sub-network are preferably ordered as well. In some instances, lateral constraints may define relationships between PSCF nodes of two pools so one pool is first processed and then the other pool is processed factoring in the lateral constraint. The order may be pre-defined or configured. Alternatively, the processing may be a race condition between the different pools and the first pool to complete processing determines the constraint enforcement on the other pool. Alternatively, they may be simultaneously processed or managed in any suitable manner. Within each sub-network, the Blocks S230, S240, and S250 are preferably implemented. The selection of nodes preferably starts at the parent feature node, then the pool nodes are activated, and the PSCF nodes are selected. The selection of a PSCF node may be at least partially influenced or determined by the enforced selection constraint of a constraint node.

Block S230, which includes selecting at least two pool nodes consistent with a function of the parent feature node, functions to appropriately activate pools of a sub-network. As mentioned before, pools are preferably groupings of PSCF nodes that correspond to invariant features. The selection preferably occurs within a parent feature node that has been configured with a selection function. The selection function is preferably an AND relationship such that each connected pool node is activated, but any suitable selection function may alternatively be used.

Block S240, which includes selecting at least a first PSCF node that corresponds to a child feature of the sub-network, functions to select a PSCF node within the set of pool members of a pool node. The selection preferably occurs for each of the selected pool nodes from block S230. The order of evaluating pool nodes within a sub-network may be ordered, in a random sequential and non-simultaneous manner. Alternatively, the pools may be evaluated simultaneously. Selecting of a PSCF node is preferably performed according to a selection function of a selected pool node. In one implementation, the selection function is an XOR function, where only one PSCF node will be selected. Any suitable selection function may alternatively be used. A PSCF node is preferably connected or otherwise associated with at least one child feature node in a direct relationship—when the PSCF node is selected, the connected child feature node is selected. In some variations, the PSCF node may be associated with multiple child feature nodes. Each child feature node is preferably selected when the corresponding PSCF node is selected. In yet another variation, the child feature node may additionally be associated with other PSCF nodes in the network or sub-network. A child feature node is preferably selected/activated based on the superposition of the connections to the child feature node.

Block S250, which includes enforcing a selection constraint on at least a second node, functions to allow invariant relationships between pools and sub-networks to be defined. The constraints are preferably created to define logic between feature pairings and patterns. In a general example, if a sub-network is piecing image components together to form an image of a car, and one pool selects the body of the car, it may enforce restrictions on other pools where the wheels of the car are selected so that the wheels and car body are kept consistent. The selection constraint may be defined through a connection between at least two PSCF nodes through a constraint node. The constraint node may include any suitable number of connected PSCF nodes and may enforce any suitable selection function. In some variations, the selection constraint may be defined through a connection between two pool nodes or any suitable type of node. Similarly, the constraint node can between any two or more type of nodes such as between a PSCF node and a pool node. The enforcing of a constraint node will preferably have some form of directionality when implemented—the selection of a first node results in selection influence on a second node. The directionality can also go any direction between two types of nodes. A PSCF node may result in a constraint node influencing a pool node, and a pool node may result in a constraint node influencing a PSCF node. One preferred selection constraint would be to enforce selection of a connected PSCF node if one of the PSCF nodes connected to the constraint node is activated. In other words, the selection constraint function of the constraint node would be an AND operation. Selection constraints are preferably enforced in response to the selection of at least a first PSCF node that has a connected constraint node. As mentioned above, the nodes are preferably evaluated or propagated in some sequential order. Selection constraints are preferably not enforced on PSCF nodes that have already been selected, but instead are enforced on the selection by a pool node. In some scenarios, a pool node may have the set of possible PSCF nodes reduced to one node after a selection constraint has been enforced and transmitted through a constraint node to a pool member. In other scenarios, a pool node may have the number of possible PSCF nodes reduced or even the probabilistic weighting for selection changed. A constraint node is shown as a connection between two PSCF nodes, but the constraints may alternatively be operatively implemented through a message passing mechanism between pool members and/or sub-networks. The messages preferably modify the operation of selection functions to in effect enforce the constraint nodes as have been described herein. The constraint nodes can be lateral constraints, external constraints, temporal constraints, and/or any suitable type of constraint. The lateral constraints are preferably enforced between two different pools. External constraints are preferably enforced between two different sub-networks. Lateral constraints and external constraints are preferably used for spatial constraints but may be used to define any suitable invariant patterns. Temporal constraints are enforced network evaluation for different instances of time. The temporal constraints can define invariant patterns across different time frames. The temporal selection constraint will determine features that can, may, or cannot happen within a sequence of features.

Block S260, which includes compiling the final child features of the network into a generated output, functions to assemble features into a generated product, representation, or analysis, simulation or any suitable output. The final child features are preferably the child feature nodes of the lowest layer of the hierarchical network. The child feature nodes preferably represent a binomial variable that is representative of the presence of particular data features. A database or mapping may be maintained that maps child feature nodes to particular data features. As shown in the example of FIG. 4, child feature nodes CF1, CF2, and CF3 individually represent a vertical bar in different horizontal positions. Compiling the final child features preferably includes mapping selected child feature nodes to data features, which are then compiled into a generated output. The activated child feature nodes are preferably components that, when combined, form a reproduction of a media. Preferably the output is similar to that of the data medium used to train or create the network. For example, if the network was trained or created for image generation, the output is preferably a substantially complete simulated image. If the network was trained with audio features, the final child features can be assembled to output an audio file or signal. When multiple network evaluations are used for a temporal signal, the final child features of a plurality of networks can be compiled into a final generated output. In an exemplary implementation, the final child features are associated with a spatial component. In other words each of the child features correspond to a particular feature of a particular aspect. For images, this spatial component is preferably a two-dimensional block location. The spatial component can additionally be three-dimensional or any suitable dimension of data. The dimensions may correspond to physical dimensions or artificial dimensions. For example, when used with data analytics, the child features may each correspond to various dimensions of the data analytics, which can preferably be compiled to form a suitable output. As the child feature nodes are preferably nodes with a binary activation state, there is preferably a mapping between the child features and an associated feature pattern. The child features preferably uniquely correspond to particular aspects of a medium. For example, an image may segment an image into a grid of blocks, and each child feature node in the lower layer is associated with a pixel pattern (e.g., a three by three pixel pattern). In this way the activated nodes are used to select various pixel patterns, and those pixel patterns are superimposed in the appropriate location within a final image.

4. Method for Inferring a Pattern from an Input by Using a Network

Figure 13:
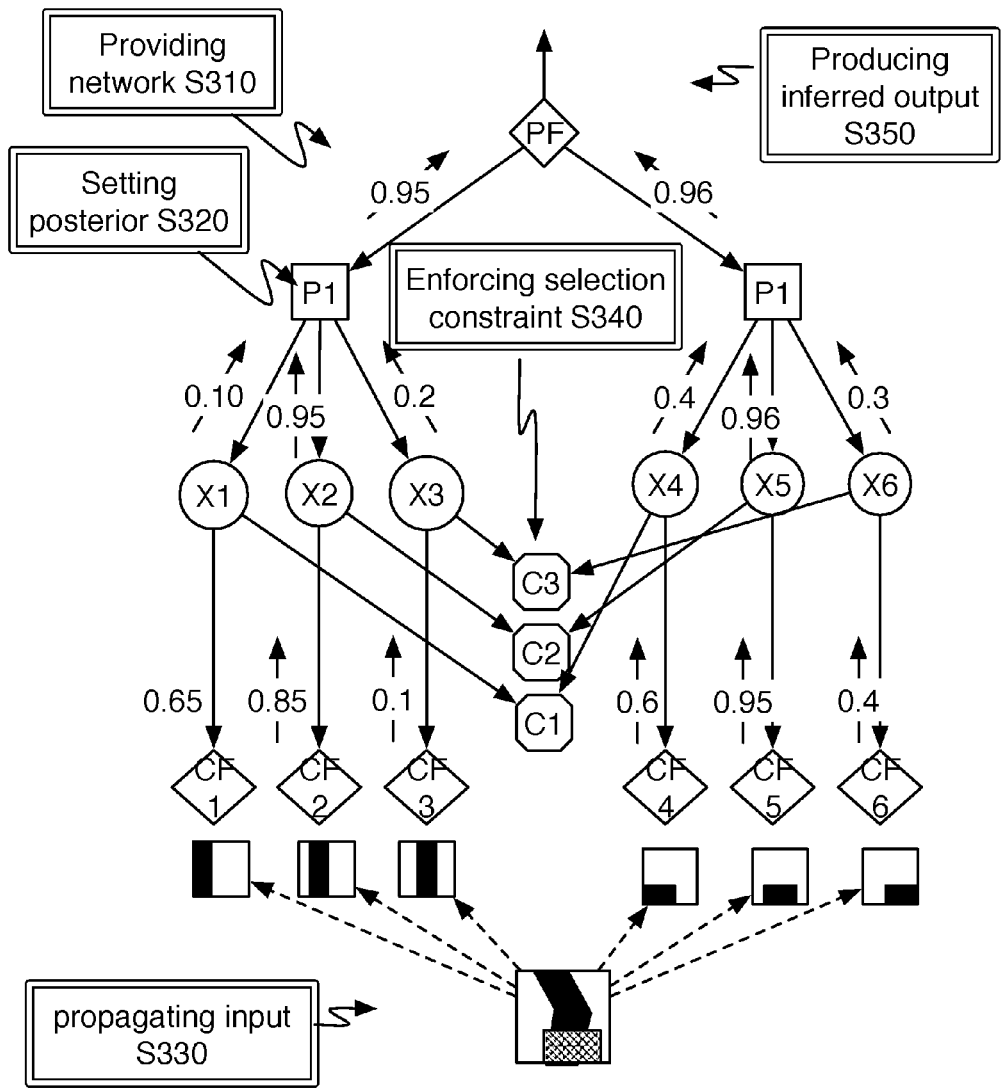
FIG. 13 is a schematic representation of a method for inferring patterns from a network of a preferred embodiment.

As shown in FIG. 13, a method S30 for inferring a pattern from a network of a preferred embodiment can include providing a network of recursive sub-networks with a parent feature input node and at least two child feature output nodes S310; configuring nodes of the sub-networks with posterior distribution models S320; propagating node selection through the network layer hierarchy in a manner consistent with node connection of sub-networks of the network S330; in response to the selection of at least a first PSCF node, enforcing a selection constraint on at least a second PSCF node S340; and outputting the parent feature nodes of the network into an inferred output S350. Method S30 functions to infer or detect patterns within input data. During inference, input data is preferably supplied. The data is converted, processed, or transformed into data features. The data features are then used to selectively activate/select various child nodes. Then a belief propagation or similar message passing approach is implemented on the network so that node selection works its way from lower layer sub-networks (e.g., layer of raw data features) up to upper layer sub-networks (e.g., layer of pattern features). Method S30 can be used in inferred patterns in a wide variety of data types such as images, video, audio, speech, medical sensor data, natural language data, financial data, application data, traffic data, environmental data, and the like. In one implementation, the method may be used for image detection to detect the presence of objects in an image or video. Additionally, the method may be employed to detect multiple objects in the same image.

Block S310, which includes providing a network of recursive sub-networks with a parent feature input node and at least two child feature output nodes, functions to implement a recursive cortical network with enforced constraints. The network is preferably a network as described above or as created in method S10. As the architecture of the network is similar to that used in method S20, method S20 and S30 can be used with the same network configuration for either generation or inference use-cases.

Block S320, which includes configuring nodes of the sub-networks with posterior distribution models, functions to add a probabilistic model from which inferences can propagate up the hierarchy. Inference is the process of finding the posterior distribution at all the nodes in a network given some evidence at a subset of nodes. The posterior distribution models are preferably parameters that specify the probability of a node being activated given the evidence. The evidence is preferably the set of nodes that are children of the particular node. The posterior distribution models may include the posterior for the set of evidence possibilities, wherein the set of evidence possibilities includes the permutations of evidence nodes being ON and OFF. The posteriors can be represented as probabilities, ratios, log of ratios, weighted selection function (where a node activates itself depending on the evidence), or any suitable representation. Alternatively or additionally, other inference mechanisms may be incorporated into method S30.

Block S330, which includes propagating node selection through the network layer hierarchy in a manner consistent with node connection of sub-networks of the network, functions to propagate belief inferences up and down the network hierarchy. Block S330 preferably uses belief propagation but other probabilistic inference approaches may alternatively be implemented. Belief propagation is preferably used to propagate selection up the network hierarchy. The propagation of node selection is additionally consistent with the posterior predication of child nodes. Belief propagation includes passing messages between nodes and performing computations in the nodes under different assumptions. The links between nodes can be constructed as bi-directional communication channels for messages. In one implementation, messages that flow upstream represent likelihoods and message that flow downstream represent probabilities. Additionally, generation or downward propagation can be used to reinforce and provide feedback to upward propagation. For example, generative propagation as described above can be used to imagine what could be in the image and comparing that to what's really in the image. In one example shown in FIG. 7, messages propagating on the links of a network can be used in inferring patterns of an image. The messages in this example represent likelihood of the evidence given that the node corresponding to the origin of the message is ON. For example, node CF2 has a higher likelihood compared to node CF1 because the representation of node CF2 is better aligned with the input evidence. The likelihood of a pool (represented by the connections originating from the pool node) is the maximum over the likelihoods of pool members. When propagating belief in a network with a sequence of inputs corresponding to subsequent time instance, the network can propagate messages in time and do temporal inference. In such a scenario, the values calculated at different nodes will be representing the probabilities given a sequence of evidence.

Propagation is preferably initiated upon receiving data feature input at the final child feature nodes of the network. The final child feature nodes are the child feature nodes of the lowest layer in the hierarchy. Data is preferably processed, converted or segmented into a set of features. The data features are then used to select or activate the final child feature nodes. In simple scenario, the presence of a feature is used to activate or not activate a child feature node. Alternatively, the likelihood parameter of the feature node can be the input. The likelihood could be a convolution similarity measurement or any suitable measure of the likelihood the feature is evident in the data. The belief propagation then continues to propagate this input up the hierarchy of the network. Within a sub-network, propagating node activation includes child feature nodes messaging a likelihood score to connected PSCF nodes; at a pool node of a sub-network, generating a likelihood score from the posterior distribution component and the likelihood score of connected PSCF nodes; at a parent feature node of the sub-network, generating a likelihood score from the posterior distribution component and the likelihood score of pool nodes connected to the parent feature node. The belief propagation then preferably continues to a higher sub-network and continues until the network propagation is exhausted or some threshold is satisfied.

Block S340, which includes enforcing a selection constraint on at least a second node, functions to allow invariant relationships between pools and sub-networks to be defined and used during inference. The constraint nodes and connections are preferably enforced in a manner substantially similar to Block S250. When a node is activated, other nodes connected through a constraint node have the constraints enforced upon them. The external constraint node is preferably between at least two PSCF nodes, but may alternatively be between any set of nodes. In one variation, the constraints may alternatively augment or alter the probability measure of the connected PSCF node and/or PSCF nodes of the same pool.

Block S350, which includes outputting the parent feature node features of the network into an inferred output, functions to process or assimilate the activated nodes of the network into an inference result. Preferably, parent feature nodes are used as an indicator of the patterns. In architecting the network, different layers preferably detect patterns with different scales of granularity. On a low level, this may include detecting specific pixel patterns such as corners or lines or dots. On a high level, this could be the detecting of patterns, like that a person is detected in the image or that a message expresses happiness. Also, each sub-network is preferably customized for particular pattern identification. In the example above, a sub-network may be for invariant corner detection. If the parent node of this particular sub-network is activated, then an inference can be made that a corner is present. A mapping may exist so that activation of a parent node of a sub-network is paired with a distinct pattern label. Inferences may come from the top layer, but may alternatively be obtained through multiple layers of the network. For example, if the method were to output the inference of "a male human is smiling", the inferences that there is a human, the human is male, and that the facial expression is a smile could be obtained through multiple layers and/or sub-networks. Also, selecting which layers and/or sub-networks are used in outputting the inference can adjust the scope of the inference. For example, when generating an inference from an image, an inference from a high layer may detect that the image is of a scene of a coffee shop. A lower layer may be used to detect that there are three tables, a male, a female, and various other coffee shop objects present in the image. An API or interface may exist such that the appropriate level of inference information can be extracted from the network. This interface preferably responds to analysis requests by appropriately selecting and formatting responses with the appropriate inference information. For example, in the interface a request may specify particular patterns of interest such as "How many people are in this image" or "what is the context of this scene" or "where are the swans in this image" or "what is the next likely state of the objects in this scene." More open-ended requests may receive greater amounts of detected patterns. The inference information manifested within the set of activated parent nodes of sub-networks can alternatively be used in any suitable manner.

5. Exemplary Uses of the System and Methods

As has been discussed, the recursive cortical network can be used in a wide variety of scenarios. The architecture of the network works for both generation and for inference. The network is additionally preferably agnostic to the forms of data that are used as input either for generation or for inference. Preferred mediums of data include 2D or 3D image data, sequences of images, video, audio, natural language text, analytics data, widely distributed sensor data, or other suitable forms of data. In one preferred field of application, the system and methods are applied to images. The network can be used in an inference mode for object detection, event analysis, facial recognition, mood detection, object tracking, and other suitable applications. In a generation mode, the network can generate simulated images. As another exemplary application, the system and methods can be applied to natural language processing. In an inference mode, context and intent of sentences can be interpreted, languages can be translated, and other language patterns could be detected. For example, the meaning of a question could be interpreted, and this may subsequently be used with the network in a generation mode so that a reply or response can be generated. In some implementations this response may be a natural language response, but could also be actions or triggering of events beyond just language communication. Other exemplary applications could include medical scan and image anomaly detection, financial data analysis and prediction, ad targeting, traffic prediction, environmental simulations, and other suitable fields of simulation, detection, or prediction. While networks are preferably created for particular applications and use cases (such as a network just for image analysis), the networks may additionally be used in combination such that more generic and high level patterns and capabilities become enabled through the expanding network of nodes. During use of the network, the configuration of the network is preferably updated and expanded to account for new data, which only further expands the processing capabilities through the network.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the recursive cortical network. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method for generating patterns with a network comprising:

providing a recursive network of sub-networks with a parent feature node and at least two child feature nodes; wherein the parent feature node is an input node and the at least two child feature nodes are output nodes;

propagating node selection down the network layer hierarchy in a manner consistent with node connections of sub-networks of the network, propagation within the sub-networks comprising:

at an activated parent feature node of a sub-network, selecting a pool node consistent with a selection function of the parent feature node;

at the pool node of a first pool, selecting at least a first parent-specific child feature (PSCF) node that corresponds to a child feature node of the sub-network; and in response to the selection of a first node of the sub-network, enforcing a selection constraint on at least a second node of a second pool according to a lateral constraint node of the sub-network; and compiling the state of final child feature nodes of the network into a generated output.

2. The method of claim 1, wherein the first node is the first PSCF node, and the second node of the second pool is a PSCF node.

3. The method of claim 2, wherein the second PSCF node of the second pool is within the sub-network of the first node.

4. The method of claim 2, wherein the second PSCF node of the second pool is in a second sub-network.

5. The method of claim 2, wherein the first PSCF node is in a network of a first time instant and the second PSCF node of the second pool is in a network of a second time instant.

6. The method of claim 2, further comprising in response to selecting the PSCF node selecting at least one child feature node, mapping selected child feature nodes to data features that are compiled into the generated output.

7. The method of claim 6, wherein the generated output is an image.

8. The method of claim 6, wherein the generated output is a sequence of images.

9. The method of claim 6, wherein the generated output is audio.

10. The method of claim 6, wherein the selection function is a Boolean logical selection function.

11. The method of claim 10, wherein the child feature nodes of a first layer sub-network are the parent feature nodes for at least two sub-networks in a second layer.

12. The method of claim 11, wherein selecting the pool node consistent with a selection function comprises selecting each pool node connected to the parent node according to a logical AND selection function; wherein selecting the first PSCF node comprises randomly selecting only one PSCF node from the set of PSCF nodes connected to the pool node according to a logical XOR selection function of the pool node.

13. The method of claim 11, wherein selecting at least a first PSCF node further comprises randomly selecting a first subset of PSCF nodes from the set of PSCF nodes connected to the pool node according to a logical XOR selection function of the pool node, the selection function applied to a plurality of subsets of the set of PSCF nodes.

14. The method of claim 13, wherein selecting the pool node consistent with a selection function comprises selecting each pool node connected to the parent node according to a logical AND selection function.

15. A method for generating patterns with a network comprising:

providing a recursive network of sub-networks with a parent feature node and at least two child feature nodes; wherein the parent feature node is an input node and the at least two child feature nodes are output nodes; and at a first sub-network of the recursive network, the first sub-network including the parent feature node and the at least two child feature nodes:

at an activated parent feature node of the first sub-network, selecting a first pool node and a second pool node consistent with a selection function of the parent feature node;

at the first pool node, selecting at least a first parent-specific child feature (PSCF) node that corresponds to a first child feature node of the sub-network;

at the second pool node, selecting at least a second parent-specific child feature (PSCF) node that corresponds to a second child feature node of the sub-network; and compiling the state of final child feature nodes, including the first and second child feature nodes, of the network into a generated output.

16. The method of claim 15, further comprising in response to selecting the first and second PSCF nodes, mapping selected child feature nodes to data features that are compiled into the generated output.

17. The method of claim 16, wherein the generated output is an image.

18. The method of claim 16, wherein the generated output is a sequence of images.

19. The method of claim 16, wherein the generated output is audio.

20. The method of claim 15, further comprising: at the first pool node, selecting at least a third parent-specific child feature (PSCF) node that corresponds to a third child feature node of the sub-network; wherein the first and third PSCF nodes are selected according to a logical XOR selection function of the first pool node applied across subsets of a set of PSCF nodes connected to the first pool node.

* * * * *